(12) United States Patent
Hosseinipour et al.

(10) Patent No.: US 11,873,017 B2
(45) Date of Patent: Jan. 16, 2024

(54) TRANSPORTATION OPERATIONS DEVICES AND METHODS

(71) Applicant: NATIONAL RAILROAD PASSENGER CORPORATION, Washington, DC (US)

(72) Inventors: Milad Hosseinipour, Hillsborough Township, NJ (US); Michael Trosino, Wyndmoor, PA (US); Michael Craft, Savage, MD (US); David Stolnis, Coatesville, PA (US); Emily Greve, Wilmington, DE (US); Thomas Robert Krotchko, Brookeville, MD (US)

(73) Assignee: NATIONAL RAILROAD PASSENGER CORPORATION, Washington, DC (US)

( * ) Notice: Subject to any disclaimer, the term of this patent is extended or adjusted under 35 U.S.C. 154(b) by 519 days.

(21) Appl. No.: 16/898,089

(22) Filed: Jun. 10, 2020

(65) Prior Publication Data
US 2021/0039695 A1    Feb. 11, 2021

Related U.S. Application Data

(60) Provisional application No. 62/883,154, filed on Aug. 6, 2019.

(51) Int. Cl.
*B61L 27/04* (2006.01)
*G06F 3/0481* (2022.01)
(Continued)

(52) U.S. Cl.
CPC ............ *B61L 27/04* (2013.01); *B61L 25/021* (2013.01); *B61L 25/025* (2013.01); *B61L 27/20* (2022.01);
(Continued)

(58) Field of Classification Search
CPC .......... B61L 27/04; B61L 27/20; B61L 27/70; B61L 25/021; B61L 25/025;
(Continued)

(56) References Cited

U.S. PATENT DOCUMENTS

| 9,734,712 | B1 * | 8/2017 | Lai | ........................ B61L 27/04 |
| 2016/0362123 | A1 * | 12/2016 | Schultz | ................... B61L 27/14 |
| 2018/0040243 | A1 * | 2/2018 | Peng | ..................... F02D 41/123 |

FOREIGN PATENT DOCUMENTS

| AU | 2014201571 A | * | 4/2014 | ............. B61L 23/00 |
| CA | 2622344 A1 | * | 6/2008 | .......... B61L 27/0027 |
| CA | 2474757 C | * | 4/2009 | ............... B61K 9/08 |

OTHER PUBLICATIONS

Colceriu et al.; Generating accuracy and integrity aware train movement maps using GNSS and MEMS sensors; 2015 IEEE Intl. Conf. on Intelligent Computer Communications and Processing (ICCP); 2015; pp. 441-446 (Year: 2015).*

* cited by examiner

*Primary Examiner* — Michael J Zanelli
(74) *Attorney, Agent, or Firm* — Reed Smith LLP; Gerard M. Donovan; Anupma Sahay

(57) ABSTRACT

Navigating a transportation network by receiving an equipment identifier, querying a section of interest database to obtain at least one section of interest associated, accessing geolocation data from one or more geolocation sensors, querying a one section of interest using geolocation data to identify a next section of interest. With geolocation data, calculating at least one of a time to a next section of interest or a distance to a next section of interest, and determining that a reduction in speed is required, where a reduced speed is an amount of speed by which the speed must be reduced in order for the equipment to achieve a target speed asso-
(Continued)

ciated with the next section of interest, and providing an alert configured to escalate to the user interface.

20 Claims, 17 Drawing Sheets

(51) Int. Cl.
*B61L 25/02* (2006.01)
*G06F 16/9537* (2019.01)
*G06F 16/29* (2019.01)
*B61L 27/20* (2022.01)
*B61L 27/70* (2022.01)

(52) U.S. Cl.
CPC ............ B61L 27/70 (2022.01); G06F 3/0481 (2013.01); G06F 16/29 (2019.01); G06F 16/9537 (2019.01); *B61L 2201/00* (2013.01); *B61L 2205/04* (2013.01)

(58) Field of Classification Search
CPC ............ B61L 2201/00; B61L 2205/04; B61L 15/0072; B61L 3/008; G06F 16/29; G06F 16/9537
See application file for complete search history.

FIG. 7

TRANSPORTATION OPERATIONS DEVICES AND METHODS

PRIORITY CLAIM

This application claims priority to U.S. Provisional Patent Application No. 62/883,154, the complete disclosure of which is incorporated by reference herein in its entirety.

FIELD

This disclosure generally relates to a system for ground transport navigation and related operations.

BACKGROUND

Transportation networks, such as railway networks, exist throughout the world, and at any given time, a plurality of individuals are traveling throughout these networks.

Railway vehicles and equipment are often equipped with, or operated using, train control, communications, and management systems. Exemplary systems are known as positive train control (PTC) systems or a predecessor to PTC systems, automatic train control (ATC) systems. These train control, communications, and management systems may include subsystems for controlling train speed based on external inputs. For example, such a system may automatically engage a train's braking systems if an engineer does not react to signal or speed restrictions on the railway. These types of systems ultimately control railway traffic by technical means, rather than relying solely on train control by an engineer.

In some cases, however, stretches of railway networks do not have such systems. Rather, some railways have no signaling systems at all; these railways are sometimes referred to as Dark Territory. In Dark Territory, an engineer navigates the railway based on timetables and operational rules maintained by a railway operator.

BRIEF DESCRIPTION OF THE DRAWINGS

FIG. 7 illustrates an exemplary data structure in accordance with this disclosure.

DETAILED DESCRIPTION

Figure 1:
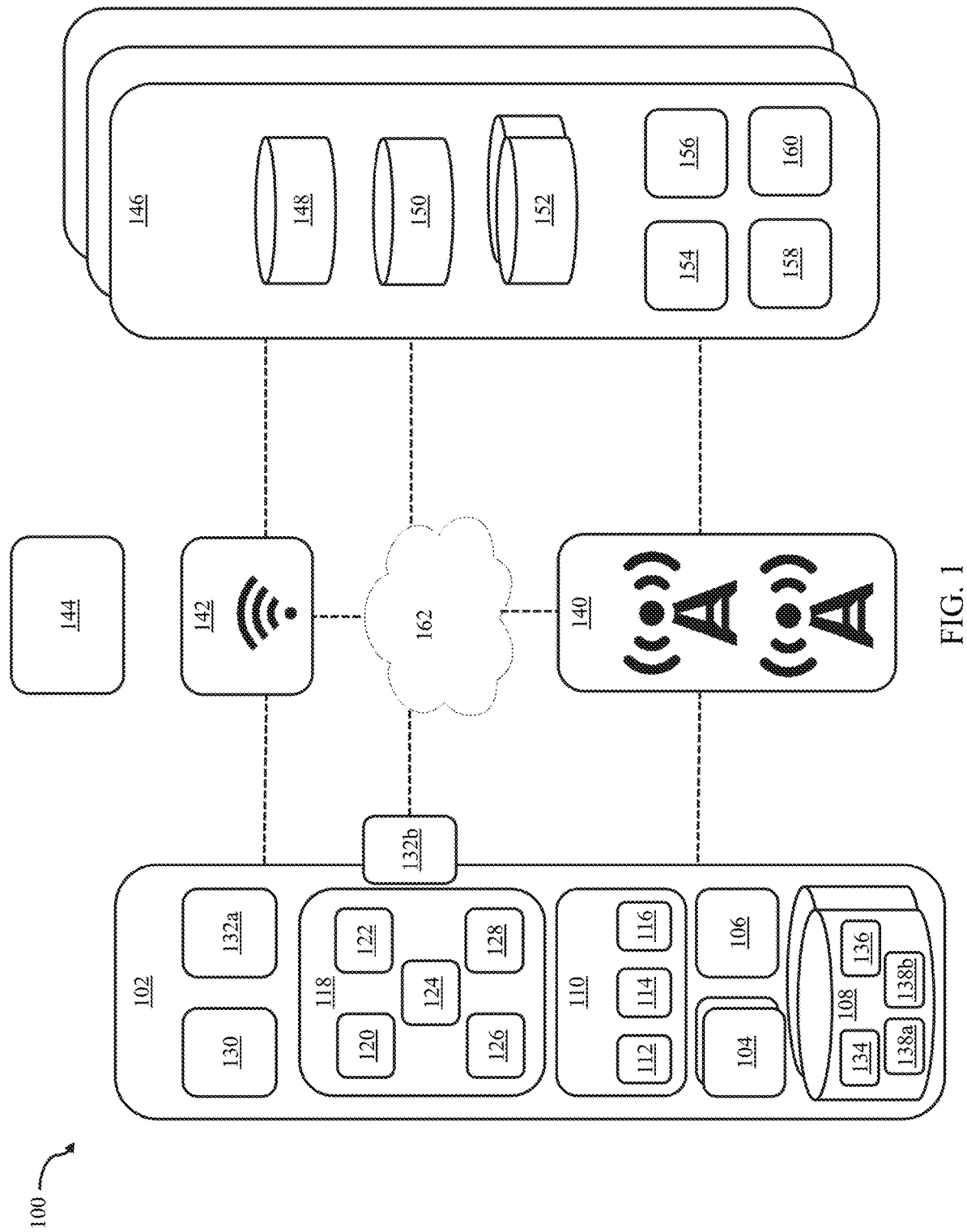
FIG. 1 illustrates a functional block diagram of a system in accordance with this disclosure.

Disclosed are one or more embodiments that incorporate features of this invention. The disclosed embodiment(s) merely exemplify the invention. The scope of the invention is not limited to the disclosed embodiments. Instead, the invention is defined by the claims hereto. References to an embodiment, or various embodiments, illustrated in the attached figures should be interpreted in an inclusive manner rather than an exclusive manner unless otherwise indicated and are intended to mean any and all embodiments that include functionality or subsets of functionality described in reference to a figure.

Known techniques for implementing rail vehicle or equipment control, communications, and management systems require significant infrastructure at considerable expense. Installing and implementing the infrastructure necessary for modern rail vehicle and equipment control, communications, and management systems is impacted by geography, population density, traffic density, existing infrastructure, and the like. Thus, even though U.S. regulations may sometimes require implementation of PTC systems or the like, these very regulations provide for exceptions where implementation of PTC systems are infeasible. Thus, many railways throughout the country lack PTC systems. Moreover, conditions arise that require control and communication of equipment through the manual transfer of operating authority and operational limits. In addition, some railways lack any sort of signaling systems whatsoever. In these Dark Territories, engineers navigate the railways in a manual fashion relying on timetables and operating rules that dictate the appropriate speeds a vehicle will travel safely along different sections of such a railway for given periods of time. These timetables dictate what speeds a vehicle will travel a particular section of a railway and for how long.

A railway time table accounts for a railway section's design speed, as well as vehicle performance calculations, qualification testing, and the need to transition from one speed to another speed as a vehicle travels between sections of a railway that may be designed for different speeds, e.g., due to curves in the railway, track makeup, or the population density around a section of railway. Timetables may also differ depending on the type of equipment used, as some types of equipment may safely travel at higher speeds than other types of equipment.

Engineers navigating a railway typically become very familiar with the timetables and traversing from section to section safely. Nevertheless, because of the time it takes to transition rail equipment from one speed to another, or to stop, engineers or other qualified personnel are required to make decisions and react to conditions or things occurring beyond a line of sight from traveling equipment. This is because rail equipment often travel at speeds where the stopping distance is greater than the sight distance, requiring operators and other qualified personnel to make anticipatory speed changes on a continuous basis, based on the physical characteristics of the railroad and, in Dark Territory, with no active technologies to help them maintain situational awareness. Thus, systems for supplementing or augmenting an operator's manual control of equipment are desirable. Similarly, other rail equipment may have particular operational restrictions that require special attentiveness from the equipment operator in regards to the infrastructure, such as operating equipment that does not conform to a standard size (e.g., oversized or high-and-wide), and thus may similarly benefit from additional navigational aids.

An exemplary system 100 for navigating a railway is shown in FIG. 1, which illustrates a functional block diagram of various embodiments in accordance with this disclosure. A railway navigation device 102 is disposed within rail equipment, such as a train, for navigating a railway. Navigation device 102 may be disposed within a train car, a locomotive, or another piece of equipment used along a railway. Navigation device 102 may, for example, be fixedly mounted within a train car or equipment, or alternatively a navigation device 102 may be small and mobile such that a conductor, engineer, or another qualified person may carry navigation device 102 on their person. Navigation device 102 may be a special purpose device customized specifically for navigating a railway in accordance with this disclosure, or alternatively navigation device 102 may be a specifically programmed general-purpose computer. In various embodiments, navigation device 102 may be a laptop, a tablet, or a mobile phone, in each case, specifically configured to navigate a railway in accordance with this disclosure. One exemplary navigation device 102 may serve multiple purposes, for example, a conductor of a railway may carry a processing device configured for scanning and validating passenger tickets, and such a processing device may also be configured to navigate a railway in accordance with this disclosure. One will appreciate after reading this disclosure that many unique special purpose devices may be augmented or enhanced to serve as a navigation device 102 in accordance with this disclosure. In one exemplary embodiment, navigation device 102 is an Apple iPhone. In another embodiment, it is an iPad. In various other embodiments, navigation device 102 may be a device configured for Google's Android operating system, a Microsoft operating system, a LINUX operating system, a UNIX operating system, or the like.

Various combinations of features may be implemented in navigation device 102, and navigation device 102 may be configured to perform multiple functions in addition to navigating railways. In embodiments described by FIG. 1, device 102 includes one or more computer processors 104 operationally coupled to one or more data stores locally on the device or remotely on the cloud. In embodiments, device 102 includes a memory device 106 and one or more non-transitory data stores 108. Device 102 further includes a user interface 110, various geo-location sensors 118, a mobile communication interface 130, a WiFi interface 132a, or a wired network interface 132b (e.g., an Ethernet, USB interface, COM, or RS-232 interface). It will be appreciated by reading this disclosure that the communications interfaces listed here are non-limiting.

User interface 110 may include a visual user interface configured to provide visual feedback to a user. User interface 110 may also be configured to accept user input. For example, user interface 110 may be a touch screen, but may also be a keyboard, or a set of preconfigured buttons for controlling device 102 in accordance with this disclosure. User interface 110 may also or alternatively accept voice commands and be capable of performing voice to text for entering responses or information into forms. In embodiments, user interface 110 is configured to provide one or more alerts, e.g., alert 112, to a user, for example, to alert a user to an upcoming change in conditions. User interface 110 may also provide an acknowledgment input 114 to a user, thereby providing a mechanism for a user to acknowledge information provided to the user through, e.g., user interface 110. Acknowledgment input 114 may be a region of a touch screen configured as a button, or it may be a physical button, or it may be a touch gesture such as a swipe or tap, or it may be a specific voice command, or it may be a specific haptic command through motion. It will be appreciated upon reading this disclosure that there are various ways for the user interface to receive an acknowledgment from a user. User interface 110 may also include an equipment identifier input 116 through which a user may enter an equipment (e.g., a train) identifier, a vehicle identifier, or an equipment operations identifier via touchscreen, keyboard, or through a voice command.

In various embodiments, user interface 110 is a combination of features including audible input and output, e.g., in the form of a speaker and a microphone; touch-based input and output, e.g., in the form of a touch screen, buttons, or haptics for providing haptic feedback; and visual input and output, e.g., a display, various lights, or eye tracking. In some embodiments, user interface 110 is purely audio, without visual or touch-based input and output, such that alert 112 is an audible tone and acknowledgment input 114 and identifier input 116 are voice commands. In other embodiments, a user interface is purely visual, while in other embodiments a combination of visual and touch-based features constitute user interface 110.

Geo-location sensors 118 may include a variety of features. While in embodiments geo-location sensors 118 may be a single sensor, e.g., a GPS sensor 120, preferred embodiments include multiple sensors. Some embodiments of railway navigating device 102 may include a GPS sensor 120, a cell tower sensor 122, a WiFi sensor 124, an accelerometer 126, and a gyroscope (gyro) sensor 128; while in other embodiments geo-location sensors 118 may include various subsets of these sensors or additional sensors. For example, an embodiment may include only a GPS sensor 120 and a cell tower sensor 122; or an embodiment may include a GPS sensor and a WiFi sensor 124; or an embodiment may include a GPS sensor 120 and an accelerometer 126 and a gyro sensor 126. Alternatively, device 102 may include only a cell tower sensor 122 and a WiFi sensor 124. It will be appreciated that a device 102 may have any combination of sensors. It will also be appreciated that a device may have a plurality of sensors, while only making use of a selection of one or more sensors at any given time, e.g., a device 102 may include a GPS sensor 120, but may not rely on GPS sensor 120 during periods when GPS sensor 120 is unable to sense GPS signals from a GPS satellite constellation 144. In embodiments that include a cell tower sensor 122, cell tower sensor 122 may be a part of mobile communications interface 130, or it may be a separate and distinct cell tower sensor 122, or it may be a software component executing on one or more processors 104 in cooperation with data provided by mobile communications interface 130. In the same manner, an embodiment that includes a WiFi sensor 124 may be a part of WiFi interface 132a, or it may be a software component executing on one or more processors 104 in cooperation with data provided by WiFi interface 132a. It will be appreciated that all of the geo-location sensors 118 may be standalone sensor devices or may be implemented in whole or in part by a software component executing on one or more processors 104. In embodiments, sensor devices are controlled directly or indirectly by operations of one or more processors 104 executing a set of instructions, e.g., instructions 134.

When present, a mobile communications interface 130 is configured to allow navigation device 102 to detect and communicate with mobile communications systems 140. Mobile communications systems 140 may constitute commercial mobile communications systems, e.g., LTE, GSM, 4G, 5G, and the like. When communicatively coupled to a mobile system 140 via mobile communications interface 130, embodiments of a navigation device 102 may communicate through a public network 162 or a private network with one or more servers, e.g., one or more servers 146. Navigation device 102 may communicate with one or more servers 146 via mobile communications interface 130 in order to access one or more services, described further below. Mobile communications interface 130 may include or be coupled to a mobile communications sensor 122 for sensing a presence of, or a strength of, a signal associated with a particular cell or mobile communications transceiver, e.g., transmitting from a fixed location on a cell tower, or the like, associated with mobile communications system 140 (as discussed further below in relation to FIG. 3). With this information, navigation device 102 may, e.g., through operations controlled by one or more processors 104 executing a software program, resolve or partially resolve a location of navigation device 102 in relation to a specific location associated with such a cell tower.

When present, a WiFi interface 132a may be configured to allow navigation device 102 to detect and communicate with a WiFi device 142. When communicatively coupled to a WiFi device 142 via WiFi interface 132, navigation device 102 may communicate through WiFi device 142 to a public network 162 or a private network with one or more servers, e.g., servers 146. Navigation device 102 may communicate with one or more servers 146 through WiFi interface 132a in order to access one or more services, described further below. WiFi interface 132a may include or be coupled to a WiFi sensor 124 for sensing a presence of or a strength of a signal associated with a WiFi device 142, e.g., transmitting from a fixed location within an environment through which equipment (e.g., a train) travels (as discussed further below in relation to FIG. 3). With this information, navigation device 102 may, e.g., through operations controlled by one or more processors 104 executing a software program, resolve or partially resolve a location of navigation device 102 in relation to a specific location associated with such a WiFi device, e.g., WiFi device 142.

Also, in embodiments, navigation device 142 may include a physical network interface 132b. Physical network interface 132b may be physically wired to a network, or an external network interface, physically implemented within a train or other rail equipment on a permanent or semi-permanent basis. This may be practical, e.g., when a navigation device 102 is fixedly mounted in a location within a train or rail equipment. Alternatively, physical network interface 132b may be an Ethernet port, a USB port, an HDMI port, a lightning port, a firewire port or the like, and may be physically coupled to an external network, e.g., 162, when a physical network interface to a network 162 (or alternatively directly to one or more servers 146) is available. In this way, navigation device 102 may establish communicative connectivity with one or more servers 146 to access various services, e.g., when a wireless communications channel is unavailable, impractical, unreliable, unsecure, or otherwise undesirable.

In embodiments, one or more processors 104 control and coordinate functionality of navigation device 102 in accordance with this disclosure. One or more processors 104 provide this control and coordination by executing one or more sets of instructions 134 or software, which may be stored in and accessed from a non-transitory data store, e.g., data store 108, or which may alternatively be stored and accessed from a remote server, e.g., servers 146. Such software may be a set of instructions 134 that may be accessed or retrieved from a non-transitory data store locally on the device or remotely on the cloud, e.g., one or more data stores 108, by one or more processors 104 and loaded into a memory device 106 from which one or more processors 104 access and execute instructions 134 in order cause device 102 (or any of its various components) to perform operations in accordance with this disclosure. Alternatively, such software may be a set of instructions that may be accessed or retrieved from non-transitory data stores 152 over a network, e.g., network 162, by one or more processors 104, via a network interface, e.g., 130, 132a, 132b, and loaded into a memory device 106 from which one or more processors 104 access and execute instructions 134 in order cause device 102 (or any of its various components) to perform operations in accordance with this disclosure. It will be appreciated that a memory device 106 may constitute one or more memory devices, e.g., a RAM chip, multiple RAM chips, cache, or the like. In embodiments, a memory device 106 may be a shared memory accessed by multiple processors such as one or more processors 104. During operations, instructions 134 may cause a processor to access, retrieve, process, and store various data, e.g., instructions 134, section of interest ("SOI") data 136, geo-location data 138a, a GPS almanac 138b, on a transitory or a non-transitory basis as needed. For example, as needed to perform various operations, one or more processors 104 may access geo-location data 138a from one or more geo-location sensors 118 and store geo-location data 138a in data store 108 or alternatively in a memory data store, e.g., 106. Similarly, during operations and as needed, one or more processors may access SOI data 136 from an SOI database, e.g., SOI database 148, via a network interface, e.g., 130, 132a, 132b, and store SOI data 136 in a data store 108 or alternatively in a memory data store, e.g., 106. Various other data may be accessed and stored in this manner, for example, milepost data from a milepost database 150, a GPS almanac 138a, or other ancillary or useful data from ancillary databases 152, as needed or useful. Furthermore, once stored in a data store, e.g., 106, 108, data may be accessed or retrieved as needed by one or more processors 104 in order to perform various operations in accordance with this disclosure. In some embodiments, instructions 134 are configured to make use of multiple cores of multiple processors. In some embodiments, instructions 134 are configured for multithreaded processing.

One or more servers 146 also include at least one processor, e.g., processor 154, at least one memory device, e.g., memory device 156, various network interfaces, e.g., network interface 158, and at least one user interface, e.g., user interface 160. In addition to memory device 156, one or more servers 146 include various data stores, e.g., an SOI database 148, a waypoint database such as a milepost database 150, and various other data stores 152 as needed, e.g., a GPS almanac database. For example, data stores 152 may store various instructions that may be accessed and executed by processor 154 in a similar manner as described above in relation to navigation device 102. Through a server's network interfaces, e.g., servers 146 may communicate with various navigation devices, e.g., navigation device 102, as various navigation devices travel various railways with various equipment, thereby providing services in accordance with this disclosure to various navigation devices.

Figure 2A:
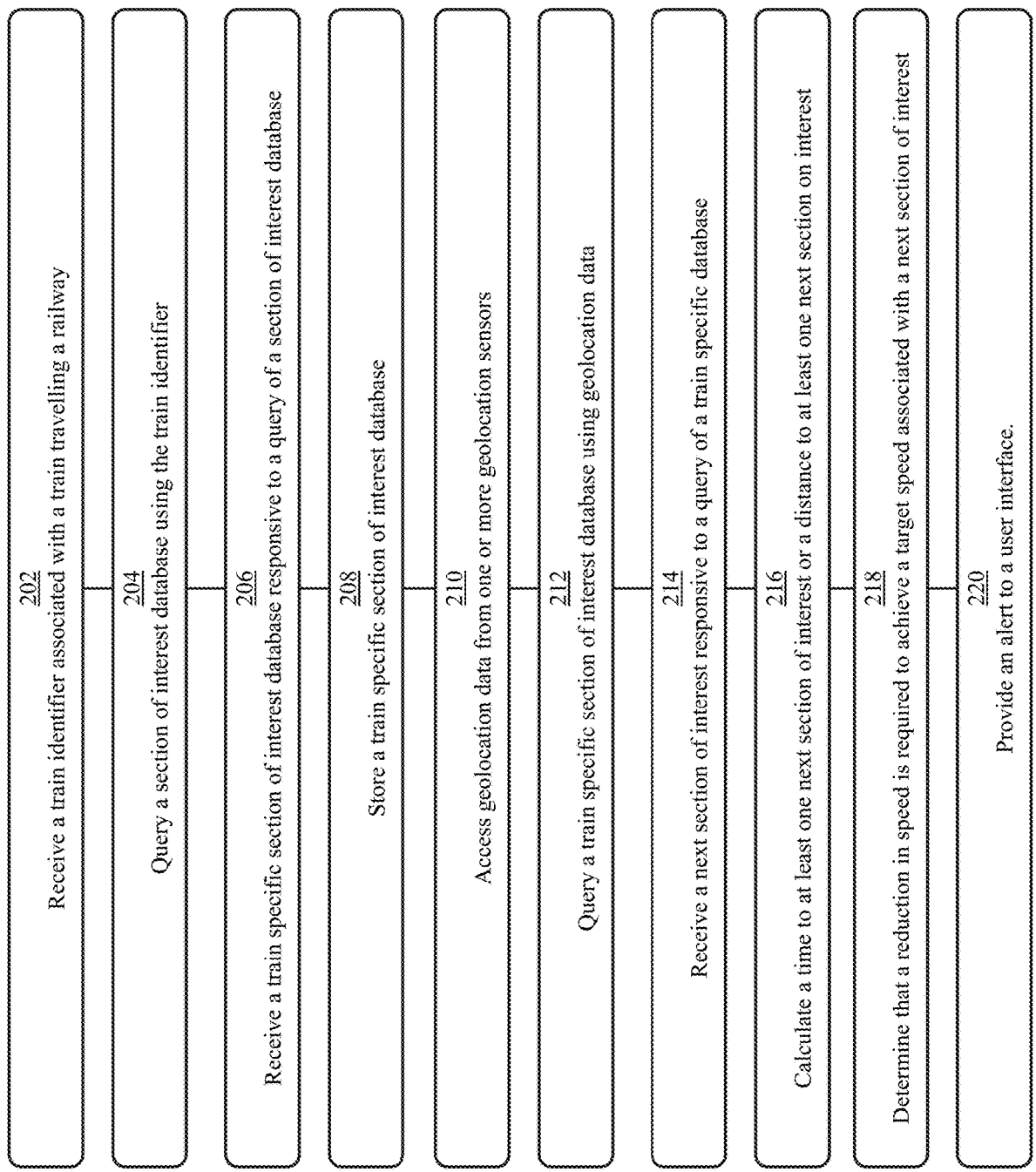
FIG. 2a illustrates an exemplary process in accordance with this disclosure.

One example of operations 200 in accordance with this disclosure described is by flow diagram illustrated in FIG. 2*a*. Operations 200 described in reference to FIG. 2*a* may be performed by a navigation device in accordance with this disclosure, e.g., navigation device 102. In embodiments, a set of instructions 134 may be executed by one or more processors 104 of navigation device 102, causing one or more components of navigation device 102 to perform a series of operations. Such operations 200 include operation 202, during which an identifier is received. An identifier may be an equipment operations identifier associated with a particular vehicle traveling a particular path through a transportation network. In embodiments, an equipment operations identifier may be associated with a particular railway equipment associated with a particular path in a railway network.

Rail vehicles and equipment typically follow predefined paths between travel points, e.g., between stations, typically moving in only one direction for a given train number, but may also have highly variable paths and directions, e.g., in the case of test or maintenance equipment or the like. Either way, an operating identifier may be unique identifier associated with a vehicle traveling a railway in a particular direction. A user of device 102, e.g., a conductor, an engineer, or another qualified individual traveling on a vehicle along a particular railway may enter an operating identifier through a user interface, e.g., 110, configured to accept an operating identifier. In embodiments, for example, an operating identifier may be a train identifier identifying a particular train traveling along a particular railway. In one example, a form is displayed on a visual user interface and configured to request a train identifier and receive via an input a train identifier. An input, e.g., 116, may be a text input, e.g., a keyboard, a touch screen, or one or more preconfigured buttons, or may be a voice input, or any suitable input as will be appreciated. Once received, an operating identifier may be stored in a data store, e.g., 106, 108, for later access by a processor, e.g., 104.

During operation 204, navigation device 102 queries a section of interest (SOI) database using an operating identifier. For example, using an operating identifier received during operation 202, a processor may issue a query to an SOI database, e.g., 148, via a network interface, e.g., 130, 132*a*, 132*b*. Alternatively, during operation 202 an SOI database stored locally in a data store within a navigation device, e.g., 102, may be queried using an operating identifier. In a preferred approach, an SOI database like database 148 is stored on a server remotely from a navigation device, e.g., 102, to minimize resources of such a device.

An SOI database may contain a record of SOIs associated with many railway vehicles and equipment, such as trains, and many specific railways or other travel paths. In one embodiment, an SOI database contains records of all railways for any train within a railway network. Alternatively, an SOI database contains a subset, or various subsets, of SOIs for a railway network.

In embodiments, an SOI is a data structure describing a section of railway or a similar travel path. A path may be represented logically by a series of SOIs. Each SOI may be constructed based on a risk and hazards analysis using vehicle dynamics data created during studies of vehicles traveling a particular route or path. Such analysis relies on convolutional speed analysis and accounts for regulatory restrictions on travel or other operational and engineering analysis as will be appreciated upon reading this disclosure. The goal of these analyses is to determine the maximum speed a vehicle or equipment may travel over a path accounting for a maximum speed of a next SOI a vehicle will travel. Thus, if a vehicle is currently traveling on a route that may be safely traversed at 110 miles per hour ("mph"), but a next SOI may only be traveled safely at 60 mph, a current SOI may include a transition section defining an approach limit, or a target speed, which a vehicle must achieve to safely travel a next SOI. These SOI speed limits may be extracted through mathematical or empirical vehicle dynamics analysis or other techniques. Vehicle dynamics analyses may include the use of industry standards for safe vehicle operation, such as maximum curving speeds analyses which are based on geometric constraints of the civil infrastructure and equipment capabilities, but these may also be based on institutional knowledge or other operands. In embodiments, each SOI may be in part defined by an analysis that considers an operational speed or condition that governs operational speed. An approach limit may be established for each SOI based on distance, time, or a combination of both to comply with the existing regulations or documented risks. When traveling in Dark Territory according to routine methods, a vehicle may exceed an approach limit without any warning to an engineer, creating a safety risk, or in a worst case scenario a risk of derailment or similar operational failure.

As used herein, rail vehicle dynamics analysis is an engineering analysis to establish estimated derailment speeds and safety factors depending on a geometry of a track, wheel-rail interactions, and vehicle dynamics. A convolutional speed analysis is a complex analysis of design standards, timetable speeds, and derailment speeds to identify sections of risk in a vehicle's route, in addition to regulatory restrictions. In embodiments, this may be implemented by an automated algorithm followed by a manual verification by the engineering department.

A convolutional speed analysis is an analysis of design standards, timetable speeds, derailment speeds, or other operational constraints to identify sections of risk in a vehicle's route, in addition to regulatory restrictions. In embodiments, this may be implemented by an automated algorithm followed by a manual verification by the engineering and/or operations departments. Infrastructure design or measurements may be used for these operational analyses, and this data may be cross-referenced with geolocation databases that are relevant to typical operations, such as known landmarks or construction markers that are used by equipment operators (and other personnel) for situational awareness (such as mile markers). Comparative distance analysis was performed to orient these engineering infrastructure measurements of the route to relevant fixed points and, thus, this civil geometric data (including curvature and track superelevation) could be related to civil speeds as prescribed in timetables for direct convolutional analysis to determine potential risks along a route. Meticulous procedures are required to manage an SOI database. Procedures are typically written, and roles and responsibilities are typically defined regarding who may make changes and how. Safety and engineering administrators should manage individual SOIs before they are compiled into data structures by IT systems administrator and then incorporated into a live SOI database, e.g., SOI database 148.

Figure 3:
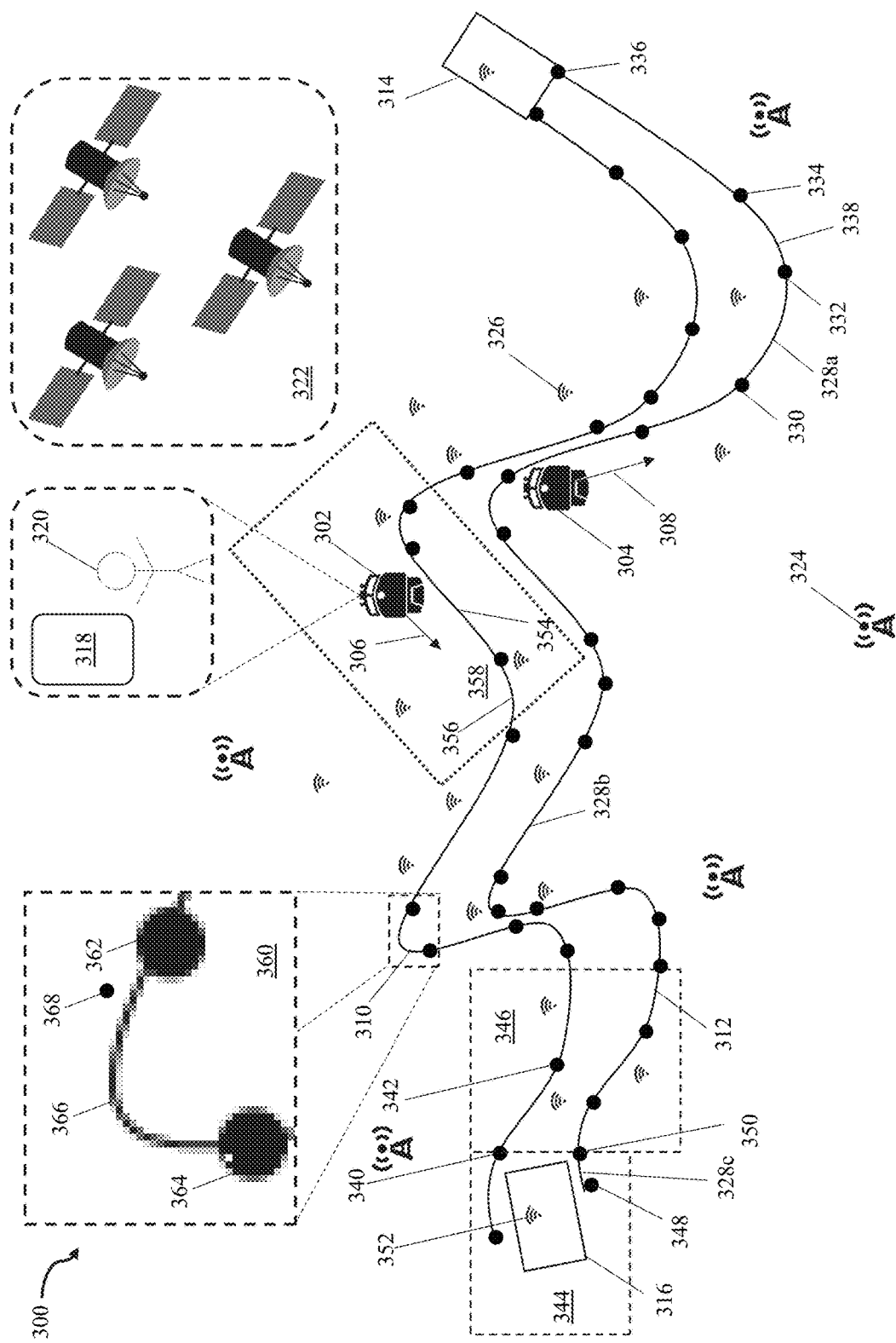
FIG. 3 illustrates an exemplary railway environment in accordance with this disclosure.

Each SOI is a piece of track with two ends. Exemplary SOIs, e.g., 360, 328*a-c*, are illustrated in FIG. 3, which illustrates an exemplary railway network 300 in accordance with this disclosure. Railway network 300 includes Dark Territory, lacking standard railway signaling systems, or PTC, or ATC. Exemplary railway network 300 is illustrated having two trains, a first train 302 and a second train 304, respectively traveling in two opposite directions, a first direction 306 and a second direction 308, along a first railway 310 and a second railway 312, between two stations a first station 314 and a second station 316. As a train travels between a first station 314 and a second train station 316, a train, e.g., 302, 304, passes through an environment that may include GPS signals from a one or more GPS satellites 322, which may be a part of GPS satellite constellation 144 shown in FIG. 1. A train's environment may also include various mobile communications towers, e.g., 324, that may be part of a mobile communications system 140, or WiFi devices 326, 142. As a train 302, 304 travels, travelers, e.g., 320, such as a conductor, an engineer, or another qualified person, may carry a navigation device, e.g., 318, which may an embodiment of navigation device 102, or a variation thereof.

Figure 7:
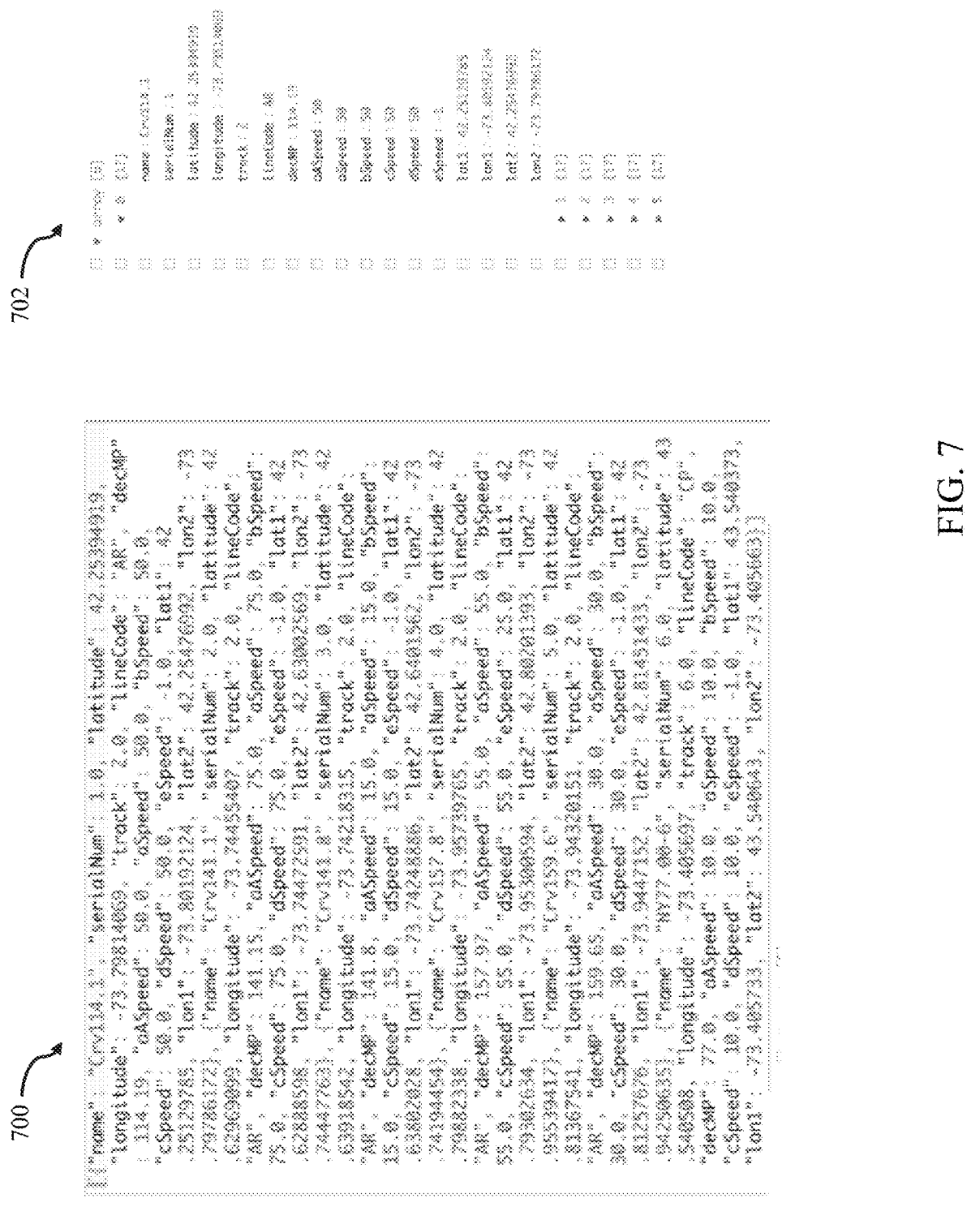

For each railway, e.g., 310, 312, a set of SOIs is defined by a set of end-points, e.g., endpoints 362, 364, 330, 332, 334, 336, 340, 342, 348, 350. An SOI record, e.g., a data structure defining SOI 360, may also be include a transition point 366. In an SOI record each end-point and a transition point may be defined by a set of latitude and longitude parameters. An SOI record may also include one or more speeds associated with the stretch of railway between each end-point. In embodiments, an SOI may be associated with multiple speeds defining a speed for multiple equipment types. Two exemplary representations 700, 702 of SOI data are illustrated in FIG. 7 as they may appear on a user interface, e.g., user interface 160, to a user reviewing, modifying, or approving an SOI. As illustrated representations 700, 702 each display a same train-specific SOI record, that is a set of SOIs that together constitute a railway for a train identified by a specific train identifier. As shown, exemplary train-specific SOI record includes an array of six SOIs, each containing seventeen data points: <name> <serial number> <transition latitude> <transition longitude> <track> <line code> <decimal milepost> <aASpeed> <aSpeed> <bSpeed> <cSpeed> <dSpeed> <eSpeed> <latitude end 1> <longitude end 1> <latitude end 2> <longitude end 2>. In exemplary SOI record display 702, each <name> represents a name of a segment, e.g., Crv114.1; each <serialNum> represents a serial number assigned to a segment, e.g., number 1 associated with SOI named Crv114.1; each <transition latitude> and <transition longitude> represent a latitude and longitude coordinates (in degrees) of a transition point, e.g., transition point 366, specifically Crv114.1 has a transition point at latitude 42.25394919 and longitude −73.79814069; <track> refers to a track number, here 2; <lineCode> refers to a line code, here AR; <decMP> indicates the milepost corresponding to a transition point; each of <aASpeed>, <aSpeed>, <bSpeed>, <cSpeed>, <dSpeed>, <eSpeed> each refer to a speed limit for, respectively, AA type equipment, A-type equipment, B-type equipment, C-type equipment, D-type, and E-Type equipment, e.g., 50 mph for all equipment types traveling Crv114.1; and each set of <latitude end 1>, <longitude end 1>, <latitude end 2>, <longitude end 2> describe the latitude and longitude of each endpoint of a segment, e.g., for Crv114.1, SOI serial number 1, defines parameters for a section of track extending from latitude 42.25129785 and longitude −73.20192124 to latitude 42.25476992 and longitude −73.79786172.

Referring back to FIG. 2a, querying an SOI database using an operating identifier includes querying an SOI database to obtain a vehicle-specific SOI database containing only the information necessary for navigating a railway associated with a specific operating identifier. Thus, in a typical scenario, operation 204 occurs prior to a vehicle (e.g., a train) departing from a station (but could occur at a later time), such that a vehicle-specific SOI database is returned, e.g., at operation 206, in response to a query executed in operation 204, prior to navigation of a railway. In embodiments a vehicle-specific SOI database, e.g., SOI data 136, is a flat file, a comma delimited file, a JSON, or another lightweight data structure to minimize navigation device resources, e.g., resources of device 318 or 102. But one will appreciate that an SOI database, e.g., SOI data 136, may be structured in any preferred manner depending on the data store technology and techniques utilized in a particular design. A vehicle-specific SOI database, e.g., SOI data 136, may include a single SOI record or may include multiple SOI records, each defining a set of SOIs associated with the vehicles route. In embodiments, an SOI database may include a plurality of SOI records, each record associated with a type of data, e.g., speed, radio channels, access points, or station. In such case, a first record may include SOIs associated with travelling speed, a second SOI record may include SOIs associated with radio channel frequencies, a third SOI record may include SOIs associated with access points, or a fourth SOI record of an SOI database may be associated with train station. In embodiments, each of these first through fourth SOI records may be associated with the same length of a railway network.

Once received, a vehicle-specific SOI database is stored in operation 208. As will be appreciated, an SOI database may be stored in a non-transitory data store, e.g., 108, or in a memory device, e.g., 106, or may be stored in both a non-transitory data store and a memory device. In a preferred scenario, because an SOI database is a lightweight structure, it is held in memory for a duration of a train's navigation of a railway for speed of access, and also stored in a non-transitory data store for backup or for disaster recovery, e.g., if a device is forced to restart or during recovery from a power loss.

During operation 210, geolocation data is accessed. Geolocation data may be accessed directly from one or more geolocation sensors, or geolocation data may be generated and stored such that during operation 210 geolocation data is accessed from memory or from a data store. In reference to FIG. 1, e.g., one or more processors 104 may directly access or retrieve geo-location data from one or more geolocation sensor 118 and store geolocation data, e.g., 138a, in memory 106 or in data store 108, or both. Subsequent operations may then operate directly on geolocation data as it is accessed from geolocation sensors or may access data from memory or from a data store as preferred by a particular design.

During operation 212, geolocation data is used to query a vehicle-specific SOI database, e.g., 136, for at least one next SOI data. For example, in reference to FIG. 3, when navigation device 318 queries a vehicle-specific SOI database, a spatial predicate, e.g., predicate 358, may be created based on geolocation data obtained during operation 210. That is, based on geolocation data describing a location of device 318 on first railway 310, its speed, and its direction of travel, 306, a spatial predicate may be configured for use to query a vehicle-specific SOI database stored on device 318, and at least one next SOI 356 record may be returned during operation 214. As in previous operations, at least one next SOI record may be stored either in memory or in a non-transitory data store or both as preferred by a particular design.

During operation 216, a time to at least one next SOI is calculated based on a vehicle's location along a railway, its speed, direction of travel, and a nearest endpoint of at least one next SOI, or alternatively a distance to at least one next SOI is calculated based on a vehicle's location and a nearest endpoint of at least one next SOI. Based on a time period or a distance calculated in operation 216, a determination is made during operation 218 that a reduction in speed of the vehicle is necessary in order for it to achieve a target speed for at least one next SOI. For example, for a train, e.g., first train 302, that is traveling at 115 mph along a section of railway at least one next SOI may be retrieved during operation 214 in response to a query in operation 212, and during operations 216 device 318 determines that first train 302 has a specific distance or amount of time until it reaches a next SOI. And during operation 218 a navigation device, e.g., 318, determines that a next SOI has a target speed limit for a train having an equipment type of first train 302 of 60 mph.

During operation 220 an alert is provided to a user. In embodiments, an alert, e.g., 112 is provided via a user interface, such as user interface 110, which may be visual, audible, or haptic, or any suitable alert. An alert may be issued for a variety of reasons, but primarily it is contemplated that an alert will notify a user that a reduction in speed of a vehicle is necessary to achieve a target speed of a next SOI. For example, continuing the example described above, device 318 determines that in order to achieve a target speed of 60 mph, first train 302 must reduce its speed by 55 mph within a calculated time or distance, and issues an alert informing a user that first train 302 has a specific distance or time to reduce speed by 55 mph. In embodiments, operation 220 may occur when a threshold is crossed, e.g., when a determination is made that a particular train, e.g., train 302, considering its authorized travel on a particular SOI at a particular speed, has crossed a threshold distance to a next segment, or a threshold amount of time, during which a train must reduce speed or risk failing to achieve a target speed prior to reaching a next SOI. In embodiments, an operation 220 occurs when a vehicle reaches a transition point, e.g., referring to FIG. 3 again, when a first train, e.g., 302, traveling an SOI defined by endpoints 362, 364, crosses transition point 366, an alert is issued to a user interface of device 318.

In various embodiments, once an alert is issued an acknowledgment input is provided to a user interface of a navigation device, and if a device, e.g., 318 or 102, does not receive an acknowledgment, it will issue escalating alerts. An example of an escalating alert may be a first alert being issued to a display of a user interface, e.g., 110 of navigation device 102, which when unanswered for a first time period, distance, or a combination of both is escalated to a second alert. A second alert may include both a visual alert being displayed and an audible alert being issued, e.g., through a speaker of a navigation device. When a second alert goes unacknowledged for a second period of time, distance, or combination of both, a third alert may be issued. A third alert may also include both a visual alert and an audible alert and further include a haptic alert, such as by causing a navigation device to vibrate. It will be appreciated that any ordering of these escalating alerts is possible as desired for a particular implementation and that further operations may result from each escalating alert. In embodiments, an alert may issue instructions to an external system, for example, a device may be operationally coupled, physically or wirelessly, to an alerting system within a vehicle that causes additional actions to occur. For example, an unacknowledged alert may result in multiple additional alerts being issued to additional personnel operating on a particular train. Alternatively, or in addition, an escalating alert may cause an alarm system on a vehicle (external to a navigation device) to sound. An alerting system or the escalation of alerts may also be customizable for individual operations or users of a device.

An alert may also include various ancillary data. As discussed in reference to FIG. 1, for example, a navigation device 102 may communicate with an SOI database residing on one or more servers 146 via various network interfaces, 130, 132a, 132b. Similarly, device 102 may obtain data from various additional databases such as a waypoint database or milepost database 150 or additional ancillary database. Device 102 may obtain waypoint data associated with the vehicle's route, such as milepost data, over a particular railway, such that device 102 may provide localization information to user interface 110. Localization information may include a fixed-object information, which may further include fixed-object coordinates. In embodiments, localization information may include milepost data. Similarly, an alert may include waypoint data, e.g., associated with a vehicle's current location, or associated with at least one next SOI.

Additional data associated with a vehicle's route along a particular railway may also be accessed. For example, information regarding radio channels used during different portions of a railway route may be accessed from ancillary databases 152 and stored by a navigation device. For example, FIG. 3 illustrates two exemplary radio channel regions 344, 346, such that a first train 302, traveling a segment between end points 340 and 342 passes from second radio channel zone 346 into first radio channel zone 344 when it travels into its next SOI. Likewise, second train 304 traveling within SOI 328c will transition from first radio channel zone 344 to second radio zone 346 at its next SOI. Thus, a navigation device, e.g., 102, 318, may provide an alert to a user interface that alerts a user to be prepared to switch radio channels at a next SOI (or after a time period has elapsed or after a distance has been traveled). Similarly, vehicle stop information may be stored within a navigation device, e.g., 102, 318. Thus, when a first train is traversing between endpoints 342 and 340, a navigation device will be aware that a stop associated with second station 316 is approaching, or when a second train 306 is traveling SOI 338, will be aware that a far endpoint 336 of a next SOI is associated with a train stop at first station 314. Accordingly, an alert associated with the next SOI may also provide train stop information to a user interface of a navigation device.

Similarly, information about nearest access points to each SOI may be accessed and stored by a navigation device, e.g., 102, 318, where an access point, e.g., 368, is a location where public safety personnel can most easily reach a vehicle within a particular SOI. For example, access point 368 may be a terminal portion of a road nearest SOI 360, where a emergency responders can most closely approach a train's location during an emergency situation causing a train to stop mid-SOI.

As discussed in more detail below, e.g., in reference to FIGS. 10-15, in some embodiments multiple upcoming SOIs are identified from one or more SOI records. The same calculations are made for each of the upcoming SOIs. The alerting and escalation remain the same, although, while one alert is escalated a vehicle, e.g., 302, may traverse a location that corresponds with an alert threshold for a second SOI. As an example, a train may approach two upcoming sections of interest (SOI A) in 6 miles, and (SOI B) in 7 miles, assuming that the threshold for triggering an initial alert is 5 miles for each. When the train reaches 5 miles from (SOI A), it triggers an alert. The distance from (SOI B) is now 6 miles. If the alert for (SOI A) is not acknowledge, then at 4 miles from (SOI A), the distance from (SOI B) will be 5 miles. At this point an initial alert for (SOI B) is triggered, while the alert for (SOI A) is escalated. In some embodiment, a device, e.g., 318, may process an essentially unlimited number of upcoming SOIs, bounded only by machine limitations. As discussed further below, e.g., in reference to FIGS. 10-15, in some embodiments this is achieved by multi-threading alerting logic in accordance with this disclosure. For the SOIs that are beyond the triggering threshold, information such as speed, time remaining, and distance remaining may be displayed in a tabular format in a user interface that may be configured to display information for multiple SOIs at a time. This allows the crew (train engineer or conductor) to have picture from upcoming sections of interest.

Figure 2B:
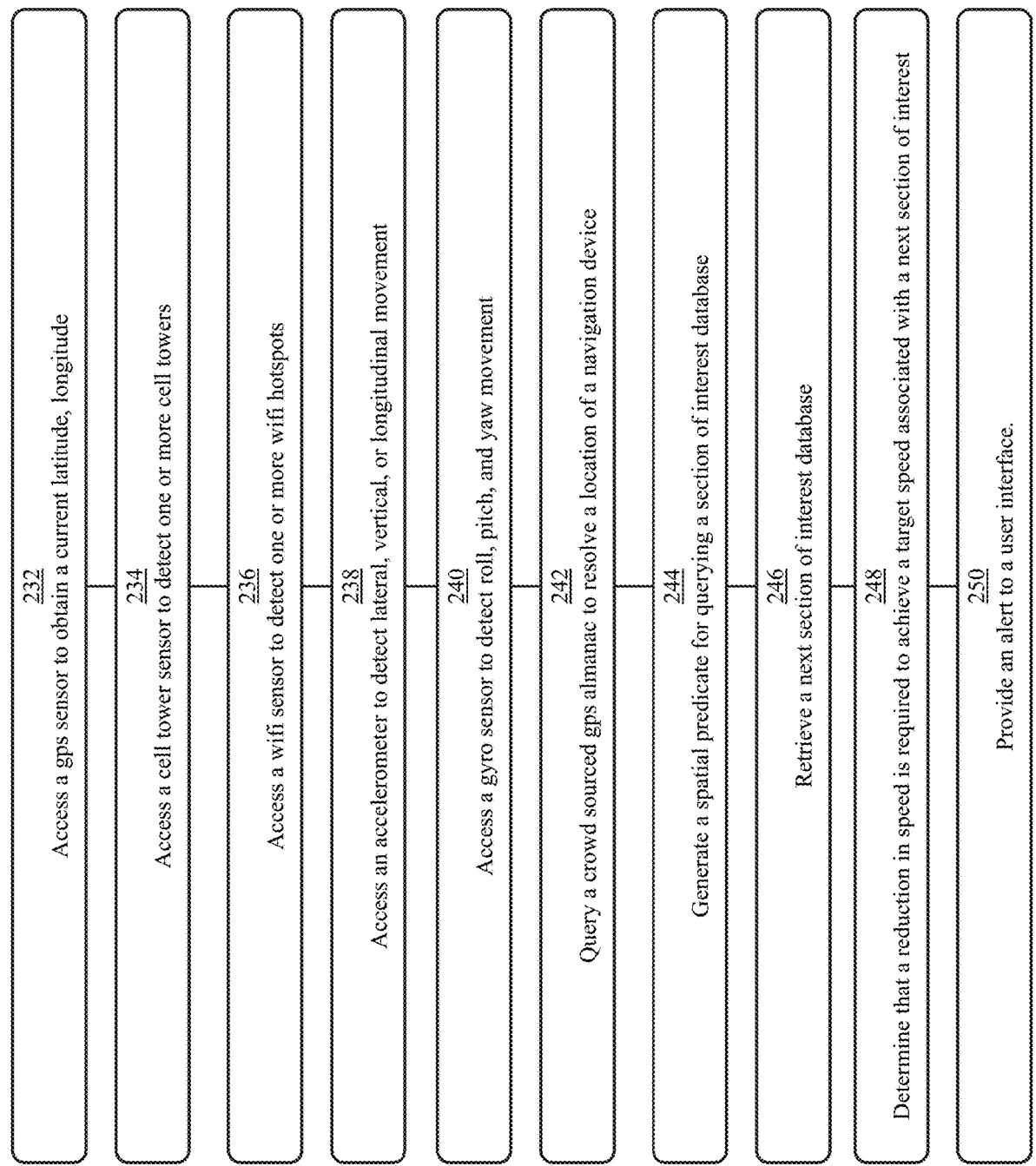
FIG. 2b illustrates an exemplary process in accordance with this disclosure.

FIG. 2b illustrates another exemplary set of operations 230 of an exemplary navigation device 102. In a first operation 232, a GPS sensor is accessed to obtain a current latitude, longitude and direction of travel, e.g., a first location. An exemplary navigation device 102 has a GPS sensor 120, but in circumstances, spatial resolution of a GPS sensor 120 may be less accurate than desired for navigating a railway. Thus, a navigation device 102 may have one or more additional sensors, e.g., a cell tower sensor 122, a WiFi sensor 124, an accelerometer 126, and a gyro sensor 128. Thus, after accessing a GPS sensor 120 to obtain a current latitude or longitude, it may be desirable to further refine a location using various additional sensors. It will be appreciated that during operations 230, accessing a sensor to obtain data may be directly or indirectly accessing a sensor. In other words, sensor data may be accessed directly from a sensor or sensor data may be stored first by a first process and subsequently accessed from where it is stored, e.g., in memory device 106 or data store 108, in a second operation.

In a second operation 234, a cell tower sensor is accessed to detect a presence of one or more cell towers. In embodiments, sensing a presence of a cell tower means sensing a signal associated with a particular cell tower, e.g., cell tower 324, and optionally a signal strength associated with such a signal. In operation 236, a WiFi sensor may be accessed to detect a presence of one or more WiFi devices, e.g., WiFi device 326. In operation 238, an accelerometer is accessed to detect lateral, vertical, or longitudinal movement, while in operation 240 a gyro sensor is accessed to detect roll, pitch, and yaw movement. Unlike a GPS sensor, e.g., GPS sensor 120, which will provide latitude, longitude, and direction of travel associated with a current location, cell tower sensors, e.g., 122, WiFi sensors, e.g., 124, accelerometers, e.g., 126, and gyro sensors, e.g., 128, do not inherently relate to a particular location. Rather, these data are referenced against a GPS almanac, e.g., 138b, to further refine a current location. A GPS almanac is a data structure storing data that associates various environmental sensor data with a location. Thus, for example as second train 304 travels between SOI 328b and 328a, a navigation device may sense various cell tower signals, including a cell tower signal associated with cell tower 324 at varying strengths as it travels the curves in second railway 312, and it may sense a WiFi signal associated with WiFi signal 326, while at the same time sensing a particular combination of lateral movements, accelerations, and yaw and pitch movements associated with a particular stretch of track, and by referencing these signals to a GPS almanac, e.g., 138b, navigation device 102 is able to refine its location substantially over a GPS signal alone. In this way, a GPS signal alone may provide a location accurate to within, for example, 70 feet, but after referencing these geo-location data points to a GPS almanac, location resolution may improve to within 5 feet or 2 feet or less than 2 feet. In various embodiments, the combination of geo-location data from multiple categories of sensors described herein allows a mobile navigation device, e.g., 318 sufficiently accurate information to resolve a conductor's or other user's distinct movement within a moving vehicle, such as a train.

In each of operation 232, 234, 236, and 238, upon obtaining the respective geo-location data from a respective sensor, a GPS almanac may be referenced in a series of successive refinements akin to filtering, or each operation 232, 234, 236, 238 may occur, and then in a subsequent step, e.g., 240, a GPS almanac may be referenced using all the geo-location data obtained from all the accessed sensor to refine a location, a speed, a course, and a heading of a device within a vehicle. Once a current location, speed, course, or heading is determined, a spatial predicate is generated at operation 244. In non-limiting embodiments, a spatial predicate may be a rectangular predicate with the current geo-spatial coordinate as the center, and dimensions dynamically calculated from speed, course, and heading. Having generated a spatial predicate, it may be used to query a vehicle-specific SOI database to obtain at least one next SOI in operation 246. And as in operation 218, at least one next SOI may be processed to determine that a reduction in speed is required to achieve a target speed associated with the next SOI in operation 248, and in operation 250, as in operation 220, an alarm is provided to a user interface.

Figure 4:
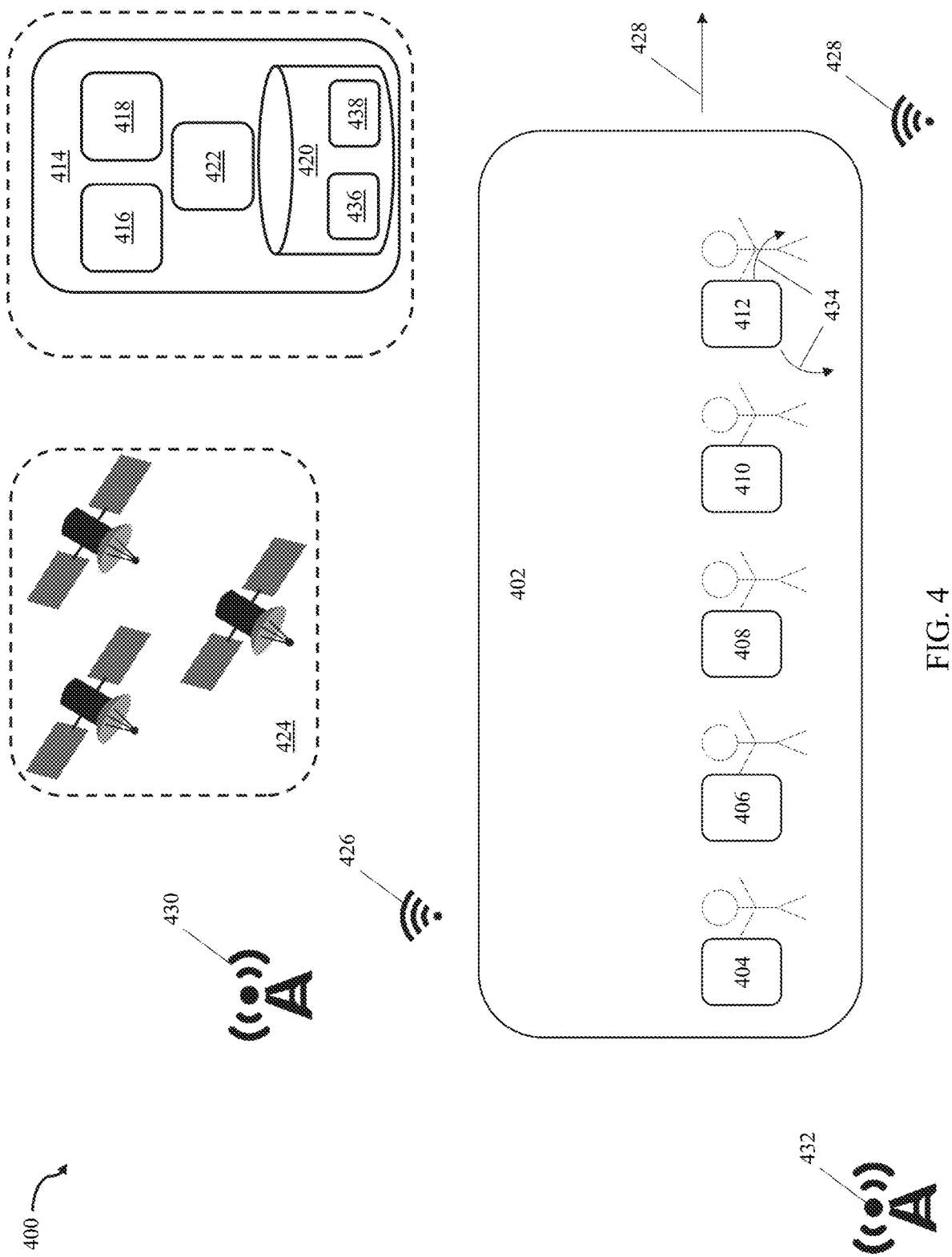
FIG. 4 illustrates various aspects of generating a GPS almanac in accordance with this disclosure.

FIG. 4 illustrates various aspects of a system 400 for creating a crowd-sourced GPS almanac 438. One or more servers 414 include at least one processor 416, a memory device 418, a network interface 422, and at least one data store 420. At least one processor 416 executes GPS compilation instructions 436 causing one or more servers 414 to receive geo-location data from a plurality of sources to create a record of environmentally available signals, e.g., from GPS satellites 424, cell towers 430, 432, WiFi sources 426, 428, and, if available, to optionally receive device accelerometer data regarding spatial movement 428 in lateral, vertical, and longitudinal directions and gyro sensor data including pitch, roll, and yaw movement. In embodiments, data may be received solely from sources associated with a railway network, e.g., 404, 406, 408, 410, 412. Alternatively, data may be received from many sources, including sources associated with or traveling on a railway network, from the general population. As these sources travel throughout the environment, a location service module within a mobile device, e.g., 404, 406, 408, 410, 412, gathers environmentally available geo-location data and reports back to a process. In embodiments, a GPS almanac, e.g., 438, is a reference allowing processing devices to reference geo-location data from various sensors to a physical location.

Whether a GPS almanac is specific to a railway or more broadly compiled from a general population, location data provided by a GPS almanac, e.g., 438, is especially robust around railways, because on a given day hundreds or thousands of passengers are traveling an identical route multiple times a day. Thus, each day a single pass of a train carrying hundreds of passengers collects large amounts of data about the environment local to a train, and the accelerations that are imposed on a passenger as passengers traverse the same sections of tracks simultaneously are repeatedly collected. Thus, as sources 404, 406, 408, 410, and 412 each travel a railway together, each, e.g., simultaneously registers first a signal having a similar strength (assuming signals are normalized, though they need not be) from cell tower 432, then as signal strength for tower 432 grows, a signal from cell tower 430 is sensed, followed by WiFi 426, and then 428, shortly thereafter each device simultaneously experiences an acceleration 428 and a series of roll, pitch, and yaw movements 434. This data is simultaneously received while also receiving GPS data from GPS satellites. With this robust data set, processor 416 executing instructions 436 receives this data as a GPS almanac 438. Decoding the GPS almanac allows for using only a snapshot of the current signal landscape, combined with the precise current time, and fragmentary satellite data to gain faster and more accurate location lock or figure out the appropriate information to use. While as used here a GPS almanac 438 is intended to mean an entirely crowd-sourced data set, alternative forms of location service almanacs are available containing additional geo-spatial data, and some forms contain no crowd-sourced data. Thus, as will be appreciated, while various embodiments rely solely on GPS almanacs 438, alternative location service type data sources may also be relied upon.

Figure 5:
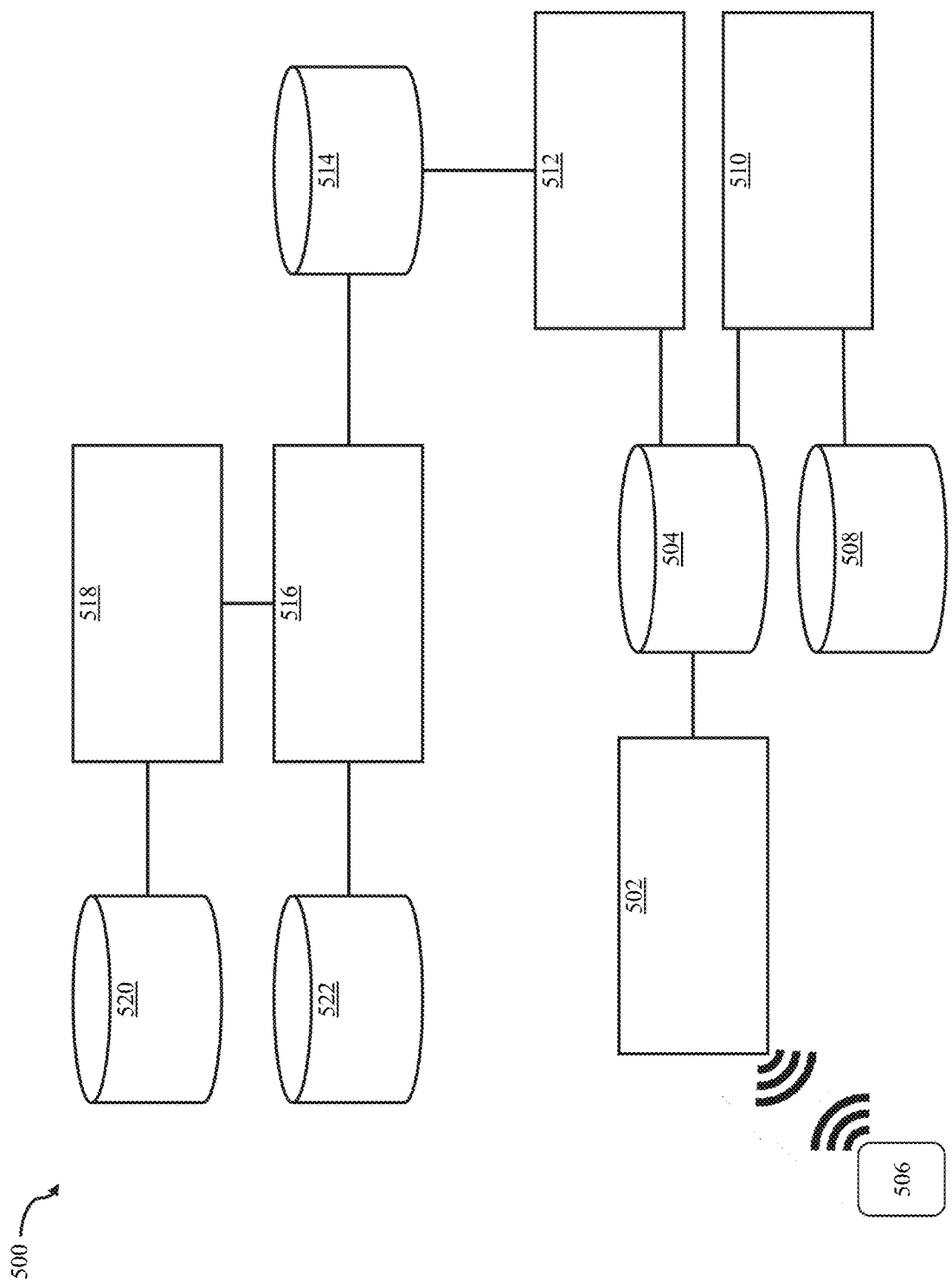
FIG. 5 illustrates a functional flow diagram of data flows in accordance with this disclosure.

FIG. 5 illustrates a functional flow diagram illustrating data flows through a system 500 for navigating a railway in accordance with this disclosure. Such a system may include a server 502 providing services for a railway navigation device 506. An SOI data generation process 516 receives as input convolutional analysis 518 based on rail vehicle dynamics data from a rail vehicle dynamics data source 520 and various regulatory data from a regulatory restrictions data source 522. The regulatory restrictions stored in regulatory restrictions data store 522 serve to enforce regulatory speed restrictions in certain SOI. Process 516 may involve both automated processes as well as manual review and editing of SOI data using a processing device via a user interface to generate SOI data for a railway network. Once generated, SOI data is stored and managed in an SOI data store. Prior to storage in a data store accessible by server 502, in various embodiments of a system for navigating a railway SOI data is converted into a flat file. In embodiments, each vehicle-specific SOI database may be stored in data server 504. However, it will be appreciated that any suitable organization of data may be used. Additional ancillary databases may also make additional data available for access by server 502. For example, 508 may store a waypoint or milepost database that may also go through a file flattening process 510 prior to being made available in data store 504. Once available, server 502 may retrieve SOI data, waypoint data, a GPS almanac, or other ancillary data from data store 504 in response to a request from device 506, which may be a navigation device 102 or navigation device 318, or a device providing various subsets of functionality as provided by devices 102, 318.

Figure 6:
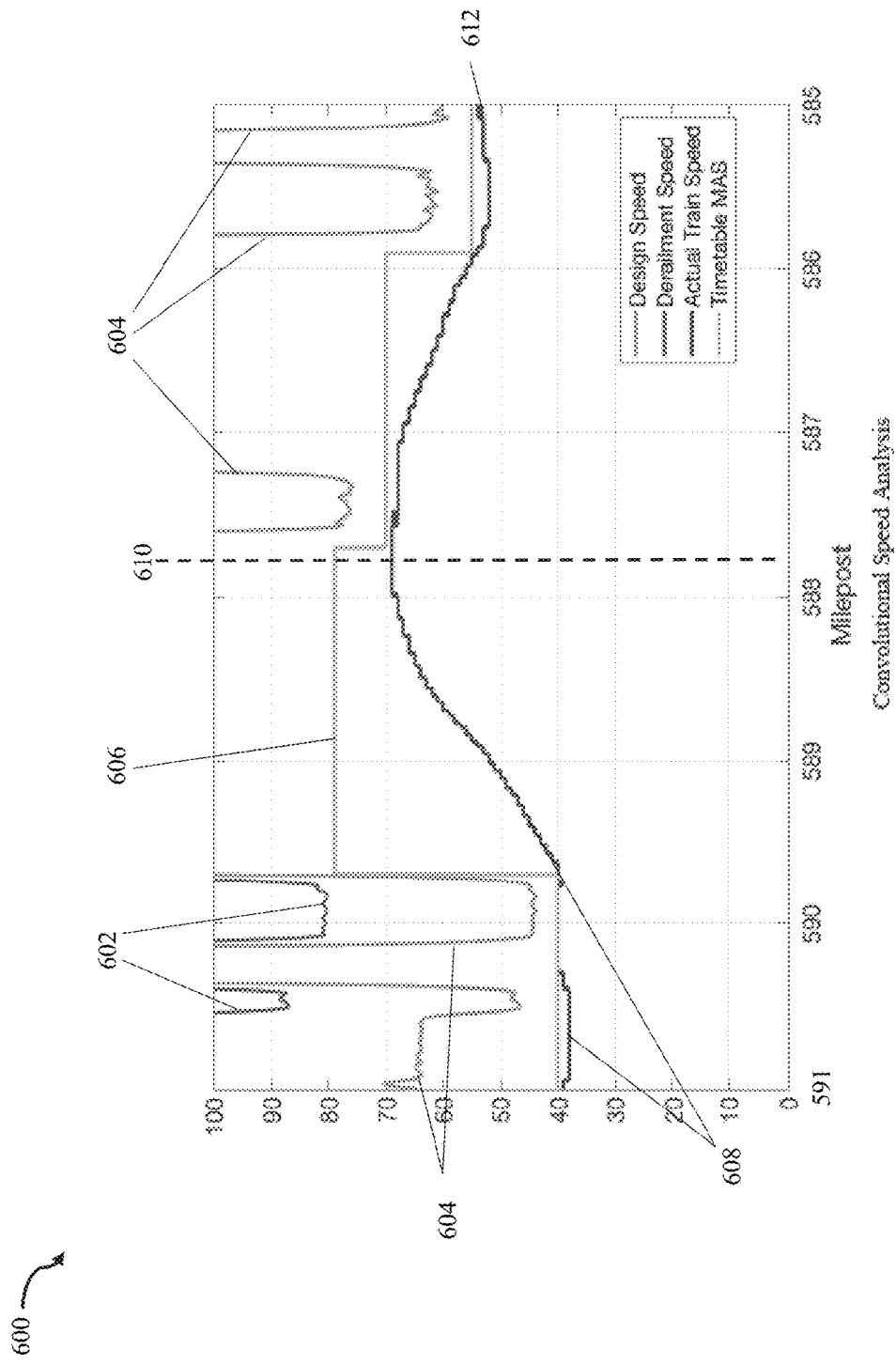
FIG. 6 illustrates aspects of a convolutional speed analysis in accordance with this disclosure.

FIG. 6 illustrates results of convolutional speed analysis, e.g., as provided during analysis 518. As illustrated, convolutional speed analysis identifies a projected derailment speed 602, an intended design speed 604, and a timetable maximum authorized speed (MAS) 606, and shows an actual train speed 608 as it traverses an associated SOI between mileposts 591 and 585. For illustrative purposes, also shown is a transition point 610 near milepost 588, at which point an alert to train personnel is desirable to inform them that a train traveling this SOI must achieve a target speed 612 of approximately 55 mph prior to reaching milepost 585.

As previously discussed, FIG. 7 illustrates two representations 700, 702 of an SOI data structure as may be displayed on a user interface.

Figure 8A:
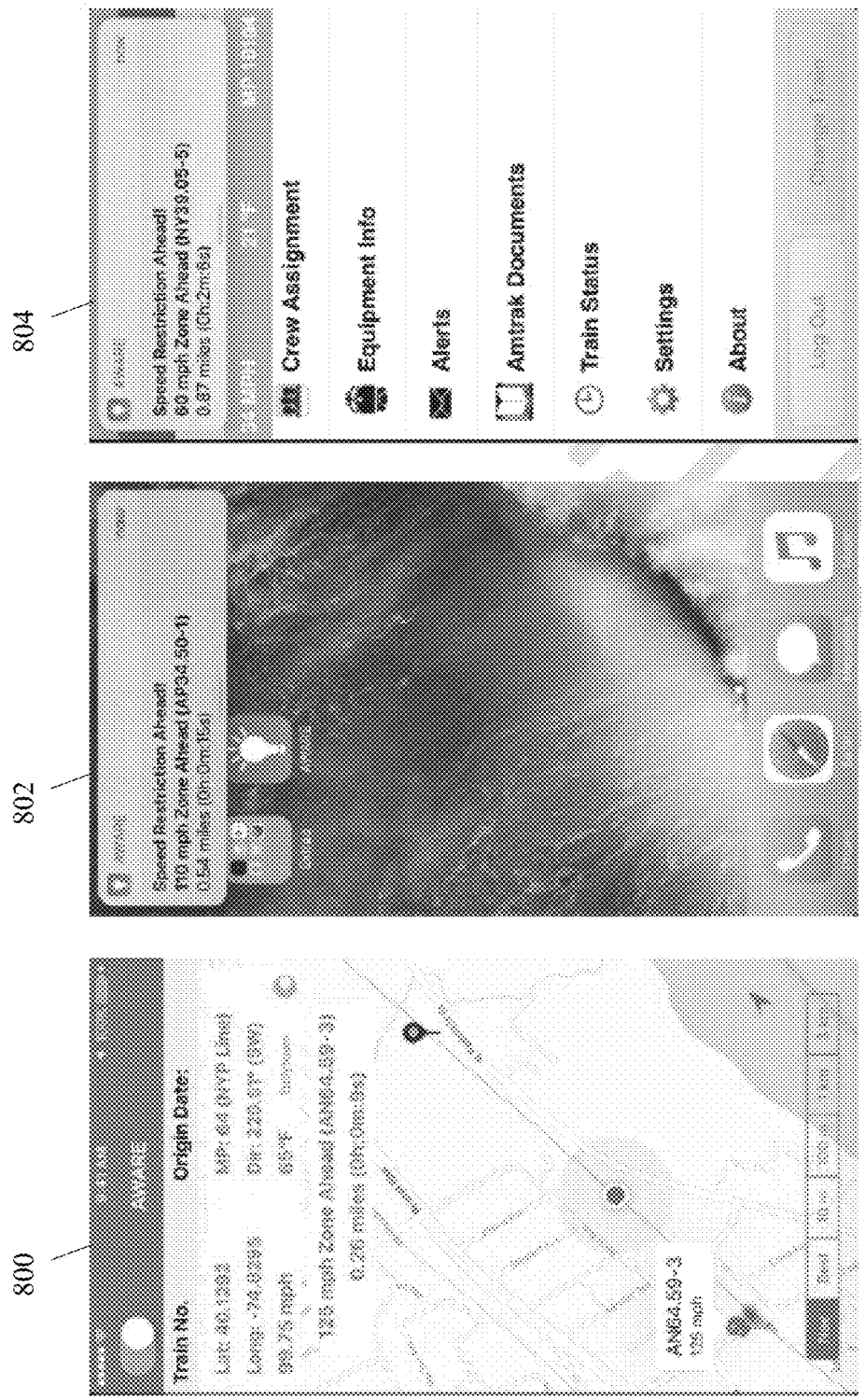
FIG. 8a illustrates various exemplary visual user interfaces in accordance with this disclosure.
Figure 8B:
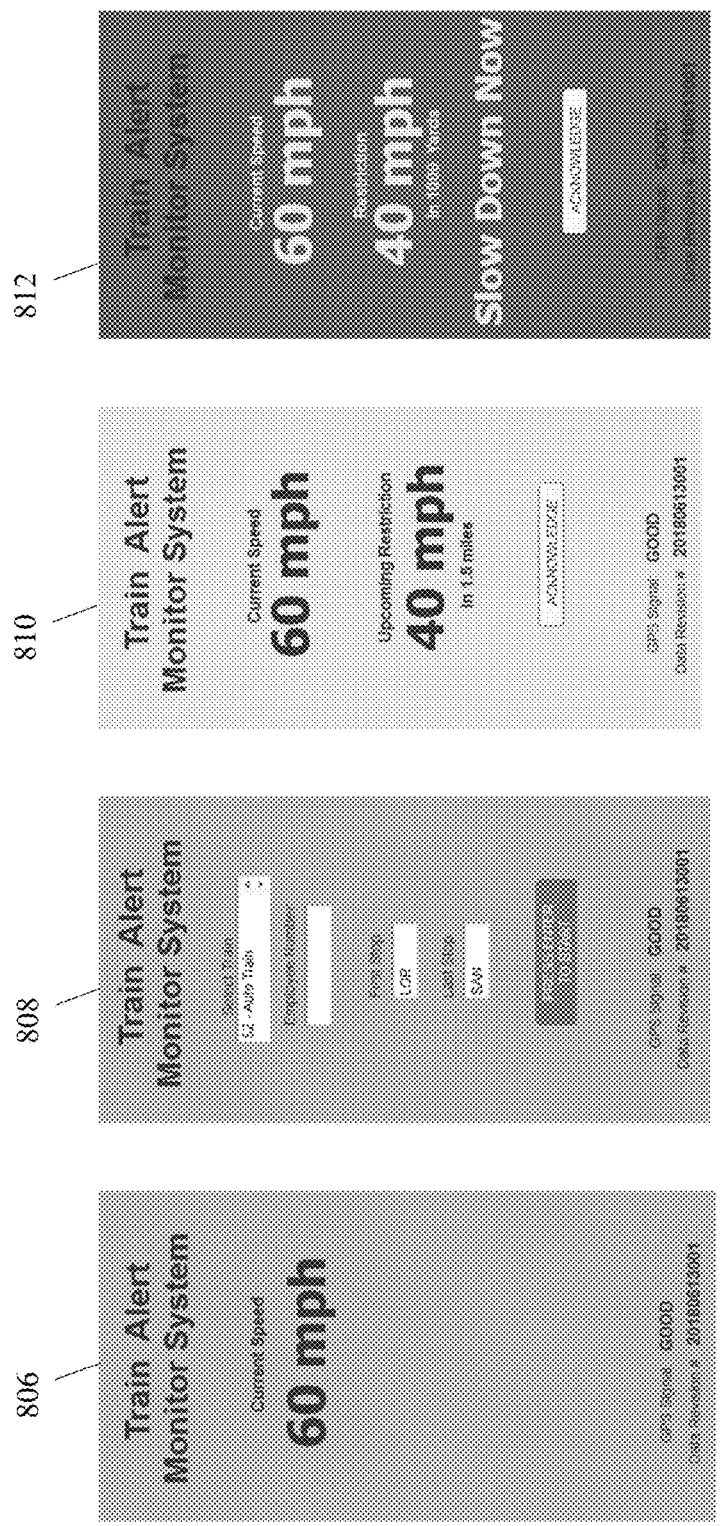
FIG. 8b illustrates various exemplary visual user interfaces in accordance with this disclosure.

FIGS. 8a and 8b further illustrates various exemplary user interfaces 800, 802, 804, 806, 808, 810, 812 that may be displayed on a navigation device 102 user interface 110. As shown in 800, a location of a train is displayed on a map showing train number, current milepost ("MP") data, current latitude and longitude data, current speed, current temperature and an alert notifying a user that a 125 mph zone is ahead. The 125 mph zone ahead is in an SOI titled AN64.59-2, is 0.26 miles away, and an estimated time to reach this SOI is listed, approximately 9 seconds in this case. Exemplary display 802 illustrates an alert notifying a user that a speed restriction is ahead in SOI AP34.50-1 having a speed limit associated with a user's train type of 110 mph. The approaching zone is 0.54 miles away and will be reached in approximately 15 seconds. Exemplary display 804 illustrates an options menu associated with software executing on a device, e.g., device 102, that also shows a current speed of 34 mph, a current temperature, and a current milepost, e.g., MP 10104, and also shows an alert notifying a user that a speed restriction is ahead having a limit of 60 mph in SOI NY39.05-5, which is 0.97 miles away and will be reached in 2 minutes six seconds. Exemplary display 806 illustrates an exemplary steady state interface that simply reports a current speed, a GPS signal strength description, and a revision date/time stamp. Exemplary display 808 illustrates an exemplary equipment identifier input interface. Exemplary display 810 illustrates an exemplary alert showing current speed and notice of an upcoming speed restriction approaching in 1.5 miles in connection with an acknowledgment input control. Exemplary display 812 illustrates an exemplary elevated alert which may issue when acknowledgment input in exemplary display 810 is not actuated before a predefined condition is met, such as within a defined period of time or within a predefined distance.

Figure 9:
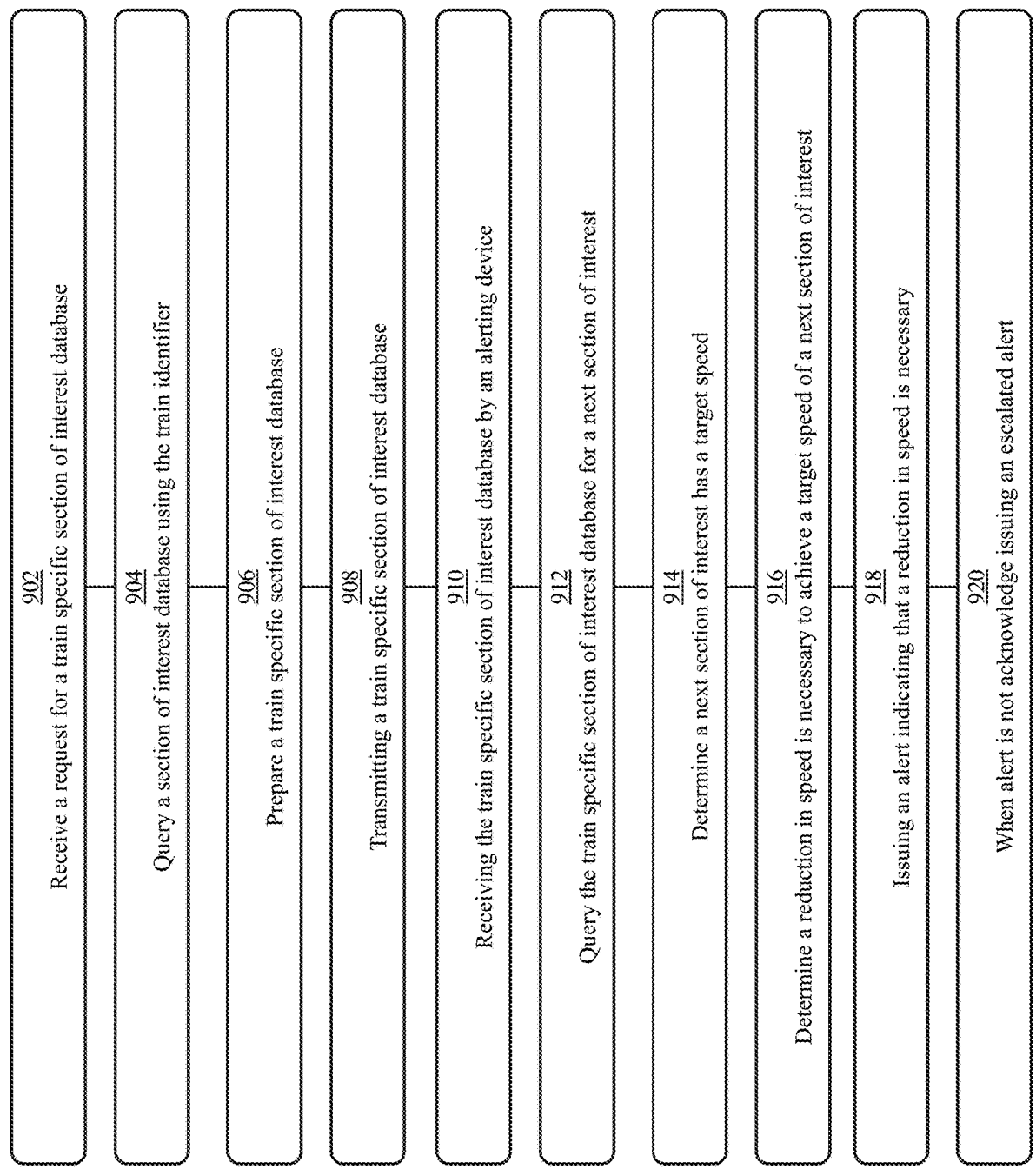
FIG. 9 illustrates an exemplary process in accordance with this disclosure.

FIG. 9 illustrates a series of exemplary operations 900 that may be executed by a processor, e.g., one or more processors 154, within one or more servers 146. First, a request for a vehicle-specific SOI database is received in operation 902. In operation 904, a general SOI database, e.g., SOI database 514, may be queried to retrieve a set of vehicle-specific SOIs, which are prepared in operation 906, e.g., a set of vehicle-specific SOIs may be compiled into a flat file or another lightweight file, which may be transmitted during operation 908 to a requesting device, e.g., navigation device 506, which may be substantially the same as device 102. Operations 910 through 920 may then proceed and be carried out by a requesting device, e.g., navigation device 506. In operation 910, a vehicle-specific SOI database is received. A query of the vehicle-specific SOI is executed in operation 912 to obtain at least one next SOI. A target speed of each next SOI is determined in operation 914. Based on determined target speed, in operation 916 it is determined that a reduction in speed is necessary to achieve the determined target speed. In operation 918, an alert is issued indicating that a reduction in speed is necessary for safe traversal of an upcoming SOI. In embodiments, the alert may be accompanied by request for acknowledgment. Alternatively, users may simply be trained to know that all alerts require acknowledgment. When an acknowledgment is not received, an escalated alert is issued in operation 920.

Figure 10:
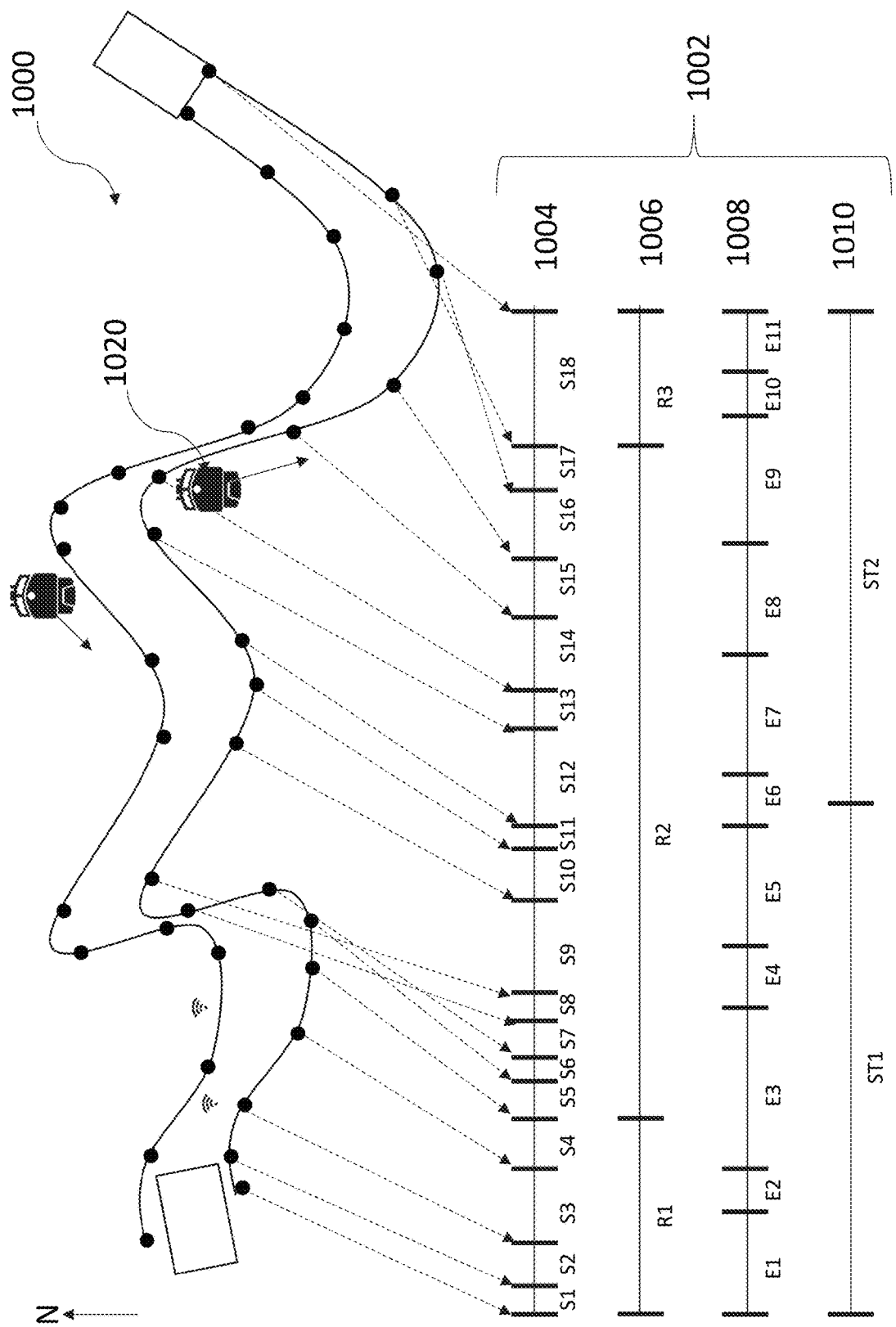
FIG. 10 illustrates aspects of exemplary segments of interest in accordance with this disclosure.

FIG. 10 illustrates various aspects of a train navigation system for a train, e.g., 1020, travelling a rail network 1000. As discussed above, a train specific SOI database, e.g., 1002, may include a plurality of SOI records, e.g., 1004, 1006,

1008, 1010, each of which contain separate and distinct SOI segments for the same stretch of railway track. For illustrative purposes, SOI record 1004 is drawn as a flattened single dimensional stretch of rail corresponding to the SOI endpoints of a stretch of railway in rail network 1000, with dashed arrows illustrating the correspondence between endpoints in rail network 1000 and SOI record 1004. In the exemplary embodiment illustrated in FIG. 10, an SOI database 1002 includes an SOI record 1004 for train speed related segments of interest S1-S18. SOI database 1002 also includes an SOI record 1006 comprising radio channel related segments of interest R1-R3. Exemplary SOI database 1002 also includes an SOI record 1008 comprising emergency entry access point related segments of interest E1-E11. And exemplary SOI record 1010 includes station related segments of interest ST1-ST2. Thus, as a train traverses the rail network corresponding to train specific SOI database 1002, a train logically traverses four separate SOIs at a given time, and a navigation device, e.g., 318, may issue alerts corresponding to one or more segments of interest from one or more SOI records 1004, 1006, 1008, 1010 within SOI database 1002 at a given time. It will be appreciate that four SOI records is merely an exemplary number, and any number of SOI records may be employed.

Figure 11:
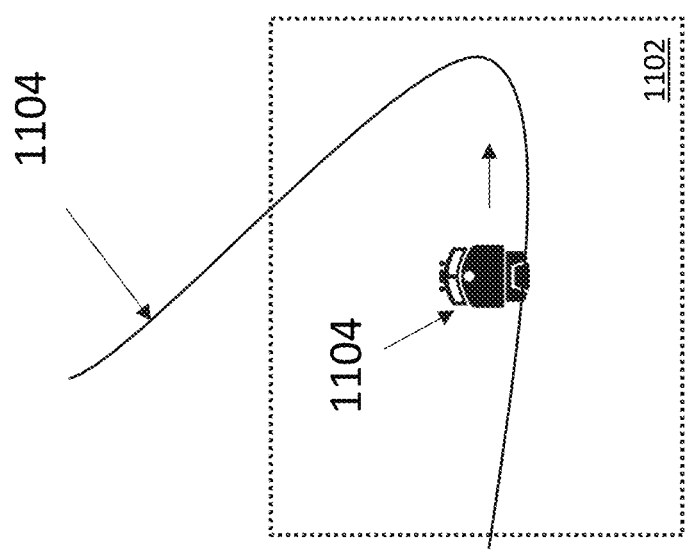
FIG. 11 illustrates aspects of an exemplary predicate in accordance with this disclosure.

FIG. 11 illustrates aspects of generating a spatial predicate 1102, e.g., as in step 244, for querying one or more SOI records of an SOI database, e.g., 136, as in step 212 or 246. A spatial predicate 1102 may be employed for example as an alternative to predicate 358 referenced in FIG. 3. A predicate is generated by creating a square shape that extends from train 1104's location for 20 miles forward, backward, left, and right. In other embodiments a predicate is generated extending 1, 5, 10, 15, 20, 25, 30, or 50 miles as dictated by the needs of the application. One will appreciate that the size of the predicate is a design choice weighing device resources and application needs, and could be less than 1 mile or more than 50 miles. For example, in various embodiments of a multithreading application as discussed below, each SOI within the predicate in the train's direction of travel will result in a separate independent thread, such that a larger predicate may result in more concurrently executing threads as the expense of processing and power resources. Also, while other geometry such as a circle having a radius of, e.g., 1, 5, 10, 15, 20, 25, or 30 or 50 or more miles may be employed as an alternative to a square-shaped predicate and would be within the scope of this disclosure, using a square shaped predicate has the benefit of increasing efficiency and reducing power consumption, because when using standard spatial querying algorithms a square shaped predicate as in predicate 1102 has the benefit of reducing a second order polynomial that arises in connection with circle shaped queries to a first order polynomial in a square-shaped predicate. In some embodiments, a predicate may have other polygon shapes. In some embodiments, each thread may generate updates every second, such that if required to employ a second order polynomial for each update, power would be consumed more quickly relative to a square shaped predicate embodiment.

Figure 12:
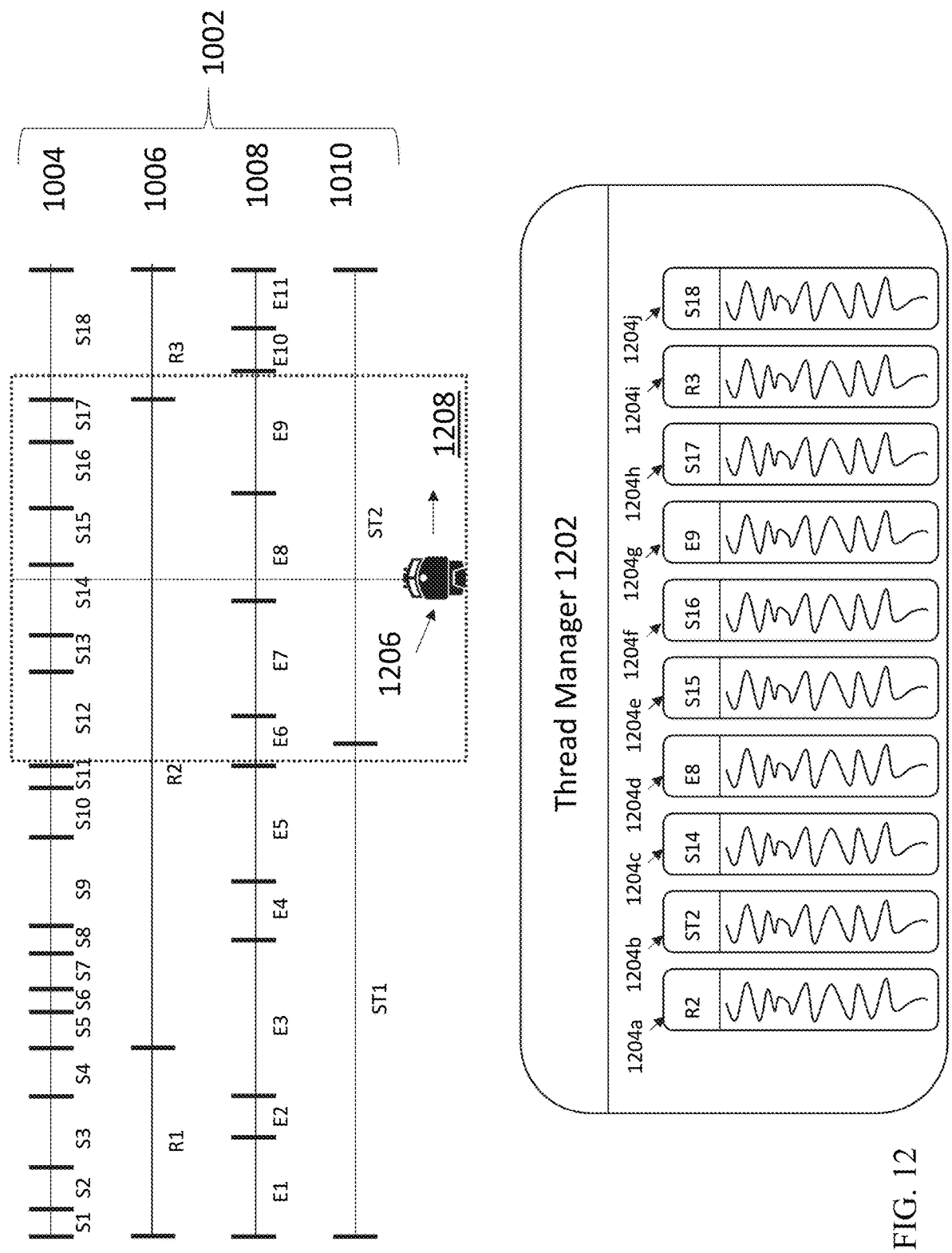
FIG. 12 illustrates aspects of an exemplary multithreading embodiment in accordance with this disclosure.

FIG. 12 illustrates aspects of an embodiment of a navigation device, e.g, 102, configured for multithreading and for employing an SOI database 1002 comprising a plurality of SOI records 1004, 1006, 1008, 1010, as discussed in reference to FIG. 10. As a train, e.g., 1206, travels a rail network along a track associated with train specific SOI database 1002, it employs a predicate 1208 to query SOI database 1002. In embodiments, a device, e.g., 102 includes instructions, e.g., 134 that may include a thread manager, e.g., 1202. When a device, e.g., 102, identifies a new SOI within a predicated, e.g., 1208, thread manager 1202 instantiates a new thread, e.g., 1204, that handles and monitors alerts for a corresponding SOI in accordance with this disclosure. A thread may be terminated, e.g., after an alert is issued by such a thread, and a user acknowledges such an alert. Also in embodiments, instructions, e.g., 134, may be configured to disregard SOIs within a predicate that are not in the direction of travel of a train, e.g., 1206. Thus, as illustrated in the exemplary embodiments of FIG. 12, thread manager 1202 currently has ten threads 1204a-1204j executing, e.g., by one or more processors 104, which threads 1204a-1204j correspond to the SOIs in which train 1206 is currently travelling, R2, ST2, S14, and E3 (i.e., threads 1204a, 1204b, 1204c, 1204d) as well as SOIs that are within predicate 1208 and in the direction of travel of train 1208, S15, S16, E9, S17, R3, S18 (i.e., 1204e-1204j). In multithreading embodiments such as the exemplary embodiments in FIG. 12, each thread is configured to access, create, and monitor corresponding data and raise corresponding alarms for the SOI that has been assigned to a particular thread. In such embodiments, a display may be configured to display each thread's SOI data and any corresponding alerts. In such embodiments, a user interface may be configured to allow a user to respond to each SOI's alerts independently of other SOIs. In embodiments, when an alert is acknowledge for a particular SOI, thread manager 1202 is configured to receive the acknowledgement (directly or indirectly) and terminate the corresponding thread. For example, if a speed related SOI, e.g., S14, threshold has been exceeded, thread 1204c issues an alarm that is displayed on the user interface of a user device, e.g., 102. Such an alarm may escalate in accordance with this disclosure if it is not acknowledged. And when acknowledged, instructions 104 cause thread manager 1202 to kill thread 1204c, but not other unrelated threads, e.g., 1204a-1204b, 1204d-1204j. When a new SOI, e.g., E8, enters predicate 1208, e.g., as the train travels, instructions 104 cause thread manager 1202 to instantiate a new thread.

Figure 13:
FIG. 13 illustrates an exemplary process in accordance with this disclosure.

FIG. 13 illustrates an exemplary process in accordance with this disclosure. In a first step 1302, a predicate is searched for segments of interest from one or more segment of interest records of a segment of interest database. For example, a predicate 1208 may be searched for segments of interest from SOI records 1004, 1006, 1008, 1010 of SOI database 1002. In step 1304, a new segment of interest is detected within the predicate and it is determined that the detected segment of interest is in the direction of travel. A new thread is instantiated to handle the new segment of interest in step 1306. As the train travels, in step 1308, a first thread provides a first indication that a first action must be taken in connection with a first segment of interest. A device, e.g., 102, then issues a first alarm responsive to the first thread's first indication that the first action must be taken in 1310. As the train continues to travel, in step 1312, a second thread provides a second indication that a second action must be taken in connection with a second segment of interest, and a second alarm is issued responsive to the second thread's second indication that the second action must be taken in 1314. In step 1316, responsive to a user acknowledging the first alarm, a first acknowledgement is received responsive to the first alarm. In step 1318, the first thread is terminated, but not the second thread and not the new thread. In step 1320, the new thread provides a third indication that a third action must be taken in connection with the new segment of interest.

Figure 14:
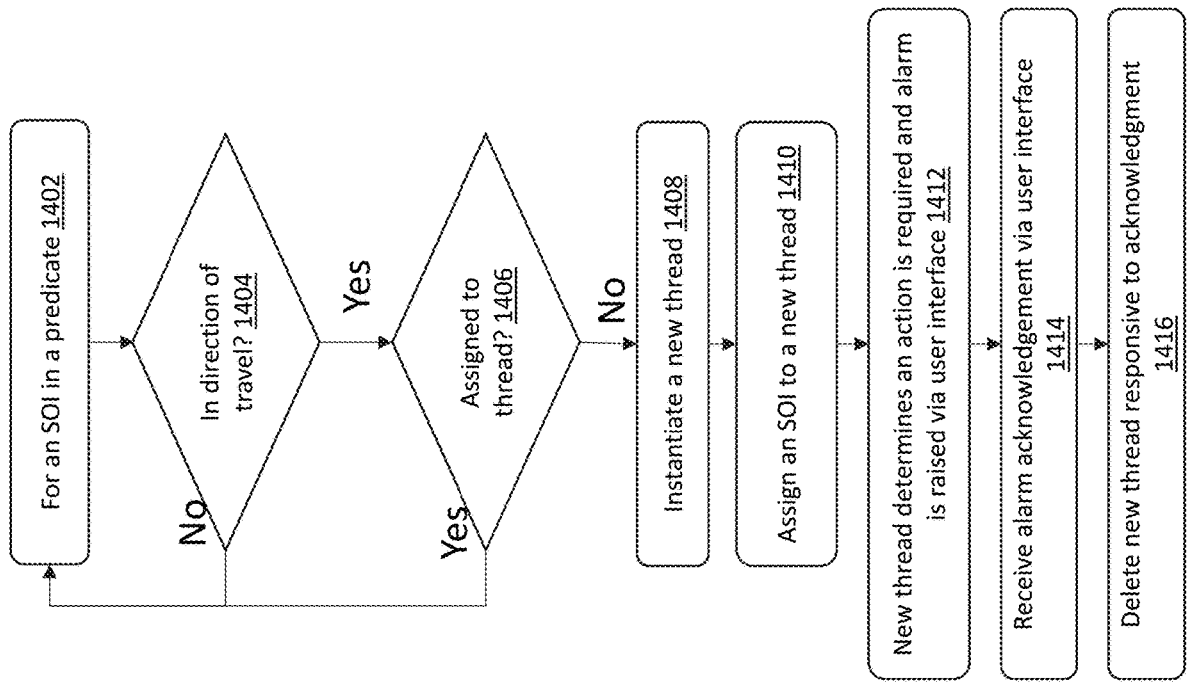
FIG. 14 illustrates an exemplary process in accordance with this disclosure.

FIG. 14 illustrates another exemplary process in accordance with this disclosure. The exemplary process of FIG. 14 may be carried out for any SOI in a predicate 1402. First, in step 1404, it is determined whether an SOI within the predicate is in the direction of train travel. In step 1406, it is determined whether an SOI within the predicate has already been assigned to a thread. On will appreciate steps 1406 may occur before or after step 1404. If an SOI within the predicate is in the direction of travel of the train, and such an SOI has not yet been assigned to a thread, a new thread is instantiated in step 1408, and an SOI is assigned to the new thread in step 1410. The newly instantiated thread determines in step 1412 that an action is required, and the thread raises an alarm to the user interface (directly or indirectly through one or more processes). When a user acknowledges the alarm, in step 1414 an acknowledgment is received, and in step 1416 the new thread is deleted or otherwise terminated or killed.

Figure 15:
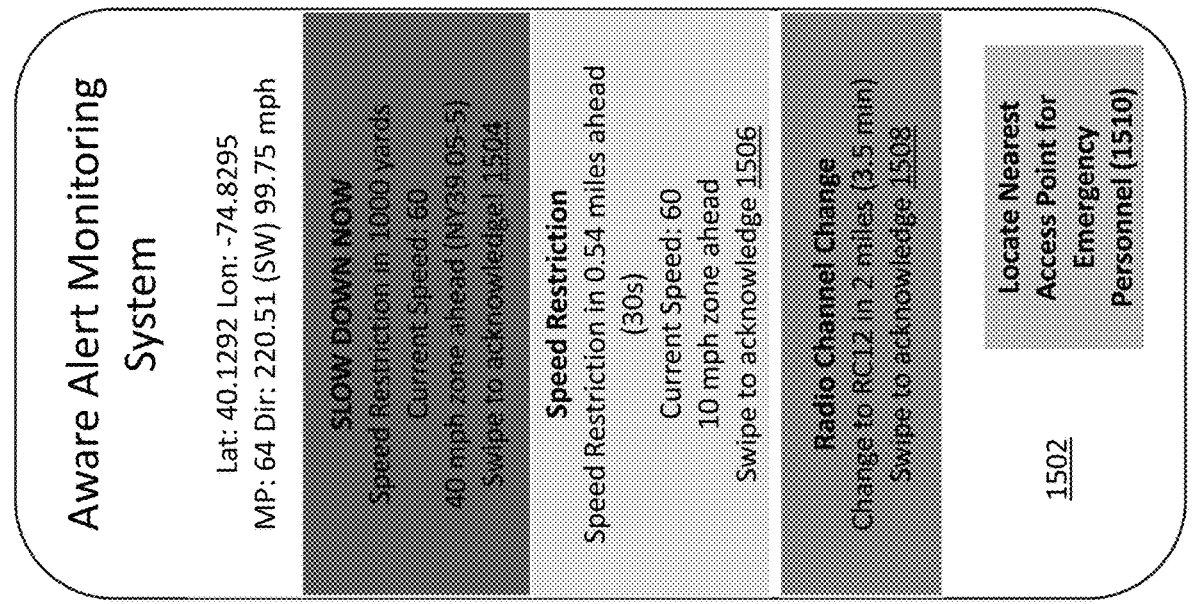
FIG. 15 illustrates an exemplary user interface in accordance with this disclosure.

FIG. 15 illustrates a user interface 1502 in accordance with this disclosure. The exemplary user interface 1502 is configured to display up to three alarms, e.g., 1504, 1506, 1508, corresponding to one or more separate SOIs, which may be of a single or multiple SOI records within an SOI database. In exemplary user interface 1502, a user may also request a nearest access point by depressing interface 1510. In various embodiments, a user may interface with an alarm by, e.g., swiping an alarm to acknowledge an alarm.

We claim:

1. A device for augmenting spatial awareness while navigating a transportation network comprising:
   a user interface;
   one or more geolocation sensors;
   one or more processors coupled to one or more memories; and
   a non-transitory computer-readable medium having executable instructions stored therein, which when executed by at least one of the one or more processors cause the system to perform operations comprising:
      receiving an equipment identifier associated with travel along a path within the transportation network by equipment;
      querying a section of interest database to obtain at least one section of interest associated with the equipment identifier;
      storing the at least one section of interest in a data store;
      accessing geolocation data from the one or more geolocation sensors;
      querying the stored at least one section of interest using the geolocation data to identify a next section of interest;
      calculating at least one of a time to the next section of interest or a distance to the next section of interest;
      determining that a reduction in speed is required, the reduction in speed being an amount of speed by which the speed must be reduced in order for the equipment to achieve a target speed associated with the next section of interest; and
      providing an alert to the user interface as a result of determining that the reduction in speed is required.

2. The device of claim 1, the operations further comprising:
   providing an acknowledge input to the user interface;
   wherein the instructions are configured to escalate the alert if a user does not actuate the acknowledge input within a period of time after the alert is provided to the user interface.

3. The device of claim 1, wherein querying the stored at least one section of interest using the geolocation data to identify the next section of interest includes:
   querying a GPS almanac with the geolocation data to determine a location of the equipment;
   defining a spatial predicate based on the location of the equipment and the geolocation data; and
   querying the stored at least one section of interest using the spatial predicate.

4. The device of claim 3, wherein the GPS almanac is a crowd-sourced GPS almanac.

5. The device of claim 4, wherein the one or more geolocation sensors include two or more of a GPS sensor, a cell tower sensor, a WiFi sensor, an accelerometer sensor, or a gyro sensor, and the geolocation data includes data provided by all of the two or more geolocation sensors.

6. The device of claim 1, wherein the operations further comprise comparing the at least one or more of a time to the next section of interest or a distance to the next section of interest with a predetermined threshold, further wherein the determining that a reduction in speed is required operation occurs in response to determining that the at least one or more of a time to the next section of interest or a distance to the next section of interest exceeds the predetermined threshold.

7. The device of claim 6, wherein the predefined threshold is determined for each of the one or more sections of interest based on characteristics of the equipment and the curves of railway within the section of interest based on rail vehicle dynamics data analysis or convolutional speed analysis.

8. The device of claim 1, wherein each of the at least one section of interest includes a transition point, the operation further comprising determining that a location of the device has crossed the transition point, wherein the determining that a reduction in speed operation occurs in response to the determining that a location of the device has crossed a transition point operation.

9. The device of claim 1, wherein the one or more sections of interest are a data structure in which at least one of the one or more sections of interest defines a segment of the path including:
   a transition latitude and a transition longitude;
   at least one segment speed; and
   an end latitude and an end longitude,
   wherein a next section of interest begins at a location associated with the end latitude and the end longitude, further wherein the target speed is one of the at least one segment speed.

10. The device of claim 1, wherein the section of interest database includes a plurality of section of interest records, and wherein a first section of interest records includes a plurality of sections of interest corresponding to a speed of a train.

11. The device of claim 1, further comprising:
   instantiating, responsive to identifying the next section of interest, a first new thread;
   allocating the next section of interest to the first new thread;
   identifying a second next section of interest;
   instantiating a second new thread; and
   allocating the second next section of interest to the second new thread,
   wherein the calculating, determining, and providing steps are performed at least in part by the first new thread.

12. The device of claim 1, wherein the operations further include:
   querying a localization information database using a location determined from the geolocation data to obtain a current location relative to a fixed object; and
   providing the localization information and the at least one or more of a time to the next section of interest or a distance to the next section of interest to the user interface, wherein the user interface includes a graphical user interface configured to display the current location, the localization data, and the at least one or more of a time to the next section of interest or a distance to the next section of interest.

13. The device of claim 1, wherein the operations further include:
   querying a radio channel database using a location determined from the geolocation data to obtain a current radio channel; and
   providing the current radio channel to the user interface, wherein the user interface displays the current radio channel.

14. A system for augmenting spatial awareness while navigating a transportation network comprising:
   a communications interface;
   one or more processors coupled to one or more memories; and
   a non-transitory computer-readable media having executable instructions stored therein, which when executed by at least one of the one or more processors cause the system to perform operations comprising:
      receiving, from an alerting device via the communications interface, a request for an equipment operations specific section of interest database, the request including an equipment identifier;
      querying a section of interest database for sections of interest associated with the equipment operations identifier, each section of interest defined by a transition latitude, a transition longitude, at least one segment speed, an end latitude, and an end longitude;
      preparing the equipment operations specific section of interest database configured to be queried using geolocation data to identify a next section of interest equipment will encounter, the equipment identified by the equipment identifier; and
      transmitting the equipment operations specific section of interest database to the alerting device on the equipment, wherein the alerting device is configured to query the equipment operations specific section of interest database as the equipment travels a railway to determine a next section of interest, and wherein the alerting device is further configured to issue an alert when a reduction in speed is necessary, the reduction in speed being an amount of speed by which a speed of the equipment must be reduced in order for the equipment to achieve a target speed associated with the next section of interest.

15. The system of claim 14, wherein the equipment operations specific database is a flat file, a comma delimited file, or a JSON.

16. The system of claim 14, wherein the at least one segment speed includes a plurality of speeds, each speed associated with an equipment class, wherein the alerting device is configured to determine the reduction in speed in part based on the class of equipment on which the alerting device is located.

17. A method of navigating a transportation network, comprising:
   receiving an equipment identifier associated with equipment traveling a set path within the transportation network;
   querying a section of interest database to obtain at least one section of interest associated with the equipment identifier;
   storing the at least one section of interest in a data store;
   accessing geolocation data from one or more geolocation sensors;
   querying the stored at least one section of interest using the geolocation data to identify a next section of interest;
   calculating at least one of a time to the next section of interest or a distance to the next section of interest;
   determining that a reduction in speed is required, the reduction in speed being an amount of speed by which the speed must be reduced in order for the equipment to achieve a target speed associated with the next section of interest;
   providing an alert to a user interface as a result of determining that the reduction in speed is required, the alert being that the reduction of speed to the target speed is required within the calculated time or distance; and
   providing an acknowledge input to the user interface,
   wherein the method is configured to escalate the alert if a user does not actuate the acknowledge input within a period of time after the alert is provided to the user interface.

18. The method of claim 17, further comprising comparing the at least one or more of a time to the next section of interest or a distance to the next section of interest with a predetermined threshold, further wherein the determining that a reduction in speed is required operation occurs in response to determining that the at least one or more of a time to the next section of interest or a distance to the next section of interest exceeds the predetermined threshold.

19. A non-transitory data store comprising instructions for navigating a transportation network, which when executed by a processor cause a device to perform the following operations:
   receiving an equipment identifier associated with equipment traveling a path within the transportation network;
   querying a section of interest database to obtain at least one section of interest associated with the equipment identifier;
   storing the at least one section of interest in a data store;
   accessing geolocation data from one or more geolocation sensors;
   querying the stored at least one section of interest using the geolocation data to identify a next section of interest;
   calculating at least one of a time to the next section of interest or a distance to the next section of interest;
   determining that a reduction in speed is required, the reduction in speed being an amount of speed by which the speed must be reduced in order for the equipment to achieve a target speed associated with the next section of interest
   providing an alert to a user interface as a result of determining that the reduction in speed is required, the alert being that the reduction of speed to the target speed is required within the calculated time or distance; and
   providing an acknowledge input to the user interface, wherein the instructions are configured to escalate the alert if a user does not actuate the acknowledge input within a period of time after the alert is provided to the user interface.

20. The non-transitory data store of claim 19, wherein the operations further comprise comparing the at least one or more of a time to the next section of interest or a distance to the next section of interest with a predetermined threshold, further wherein the determining that a reduction in speed is required operation occurs in response to determining that the at least one or more of a time to the next section of interest or a distance to the next section of interest exceeds the predetermined threshold.

* * * * *